US012573357B2

(12) United States Patent
Cai et al.

(10) Patent No.: US 12,573,357 B2
(45) Date of Patent: Mar. 10, 2026

(54) GENERATING FOVEATED IMAGE DATA

(71) Applicant: QUALCOMM Incorporated, San Diego, CA (US)

(72) Inventors: Lukai Cai, San Diego, CA (US); Zhen Liu, San Diego, CA (US); Pawan Kumar Baheti, Bangalore (IN); Hao Meng, San Diego, CA (US); Jiafu Luo, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/752,610

(22) Filed: Jun. 24, 2024

(65) Prior Publication Data

US 2025/0391389 A1    Dec. 25, 2025

(51) Int. Cl.
*G02B 27/00* (2006.01)
*G02B 27/01* (2006.01)
*G06V 10/25* (2022.01)
*G09G 5/391* (2006.01)

(52) U.S. Cl.
CPC ......... *G09G 5/391* (2013.01); *G02B 27/0093* (2013.01); *G02B 27/0172* (2013.01); *G06V 10/25* (2022.01); *G02B 2027/0138* (2013.01); *G09G 2340/0407* (2013.01)

(58) Field of Classification Search
CPC ............. G02B 27/0172; H04N 13/383; H04N 13/344; G06F 3/012; G06F 3/013
See application file for complete search history.

(56) References Cited

U.S. PATENT DOCUMENTS

| | | | |
|---|---|---|---|
| 11,238,340 B1 * | 2/2022 | Anderson | G06N 3/02 |
| 11,379,952 B1 | 7/2022 | Sharma et al. | |
| 2018/0137602 A1 * | 5/2018 | Spitzer | G06T 11/001 |
| 2019/0156794 A1 | 5/2019 | Young et al. | |
| 2022/0301217 A1 * | 9/2022 | Stuart | G06T 7/60 |
| 2023/0251709 A1 | 8/2023 | Uenishi | |
| 2023/0334761 A1 | 10/2023 | Blackmon et al. | |
| 2023/0393653 A1 | 12/2023 | Chernyak et al. | |
| 2024/0007771 A1 * | 1/2024 | Berkovich | G06F 3/013 |

FOREIGN PATENT DOCUMENTS

WO        2023163799        8/2023

* cited by examiner

*Primary Examiner* — Yuzhen Shen
(74) *Attorney, Agent, or Firm* — QUALCOMM Incorporated

(57) ABSTRACT

Systems and techniques are described herein for generating foveated image data. For instance, an apparatus for generating foveated image data is provided. The apparatus may include a memory; and a first processor communicatively connected directly to an image sensor and communicatively connected to the memory, the first processor configured to: determine an orientation of at least one eye of a user; store an indication of the orientation in the memory; and provide the indication of the orientation to the image sensor wherein the image sensor is configured to capture a foveated image based on the indication of the orientation, the foveated image comprising a first portion and a second portion, wherein the first portion is based on the indication of the orientation and has a first resolution, and wherein the second portion has a second resolution that is lower than the first resolution.

20 Claims, 14 Drawing Sheets

204

206

206

200

202

208

210

212

600

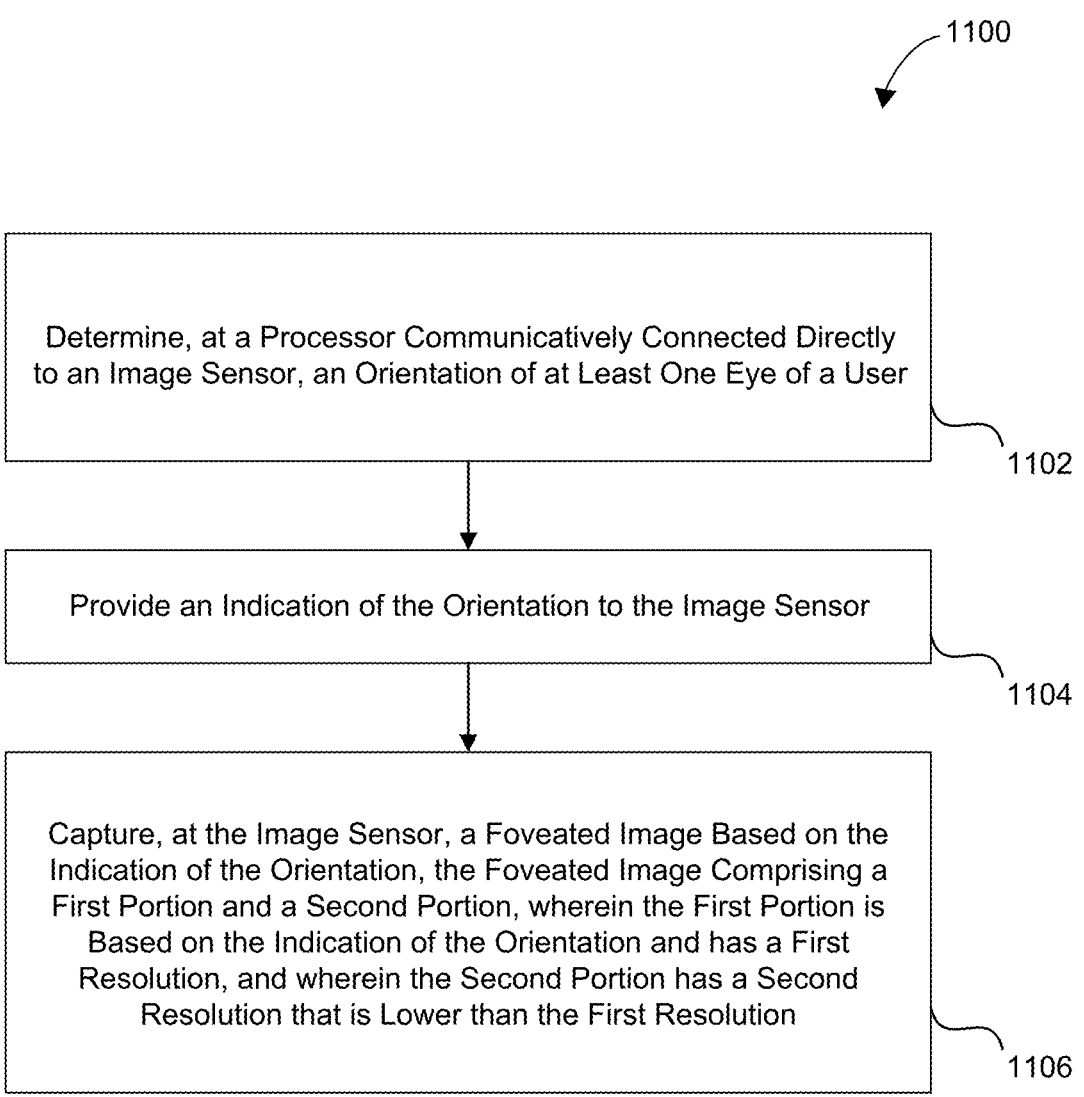

1100

Determine, at a Processor Communicatively Connected Directly to an Image Sensor, an Orientation of at Least One Eye of a User

1102

Provide an Indication of the Orientation to the Image Sensor

1104

Capture, at the Image Sensor, a Foveated Image Based on the Indication of the Orientation, the Foveated Image Comprising a First Portion and a Second Portion, wherein the First Portion is Based on the Indication of the Orientation and has a First Resolution, and wherein the Second Portion has a Second Resolution that is Lower than the First Resolution

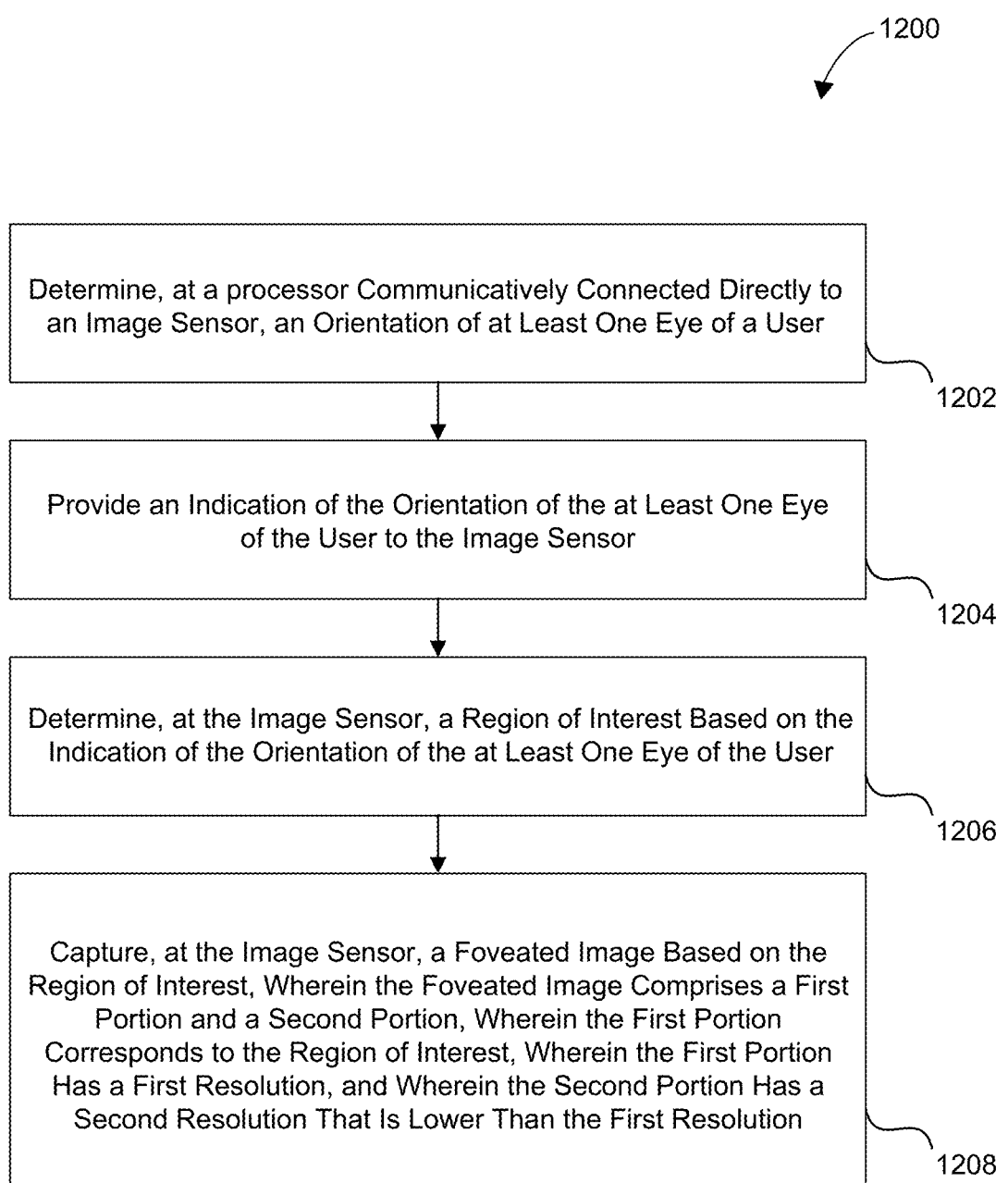

1200

Determine, at a processor Communicatively Connected Directly to an Image Sensor, an Orientation of at Least One Eye of a User

1202

Provide an Indication of the Orientation of the at Least One Eye of the User to the Image Sensor

1204

Determine, at the Image Sensor, a Region of Interest Based on the Indication of the Orientation of the at Least One Eye of the User

1206

Capture, at the Image Sensor, a Foveated Image Based on the Region of Interest, Wherein the Foveated Image Comprises a First Portion and a Second Portion, Wherein the First Portion Corresponds to the Region of Interest, Wherein the First Portion Has a First Resolution, and Wherein the Second Portion Has a Second Resolution That Is Lower Than the First Resolution

GENERATING FOVEATED IMAGE DATA

TECHNICAL FIELD

The present disclosure generally relates to foveated image data. For example, aspects of the present disclosure include systems and techniques for generating foveated image data.

BACKGROUND

A camera can receive light and capture image frames, such as still images or video frames, using an image sensor. Cameras can be configured with a variety of image-capture settings and/or image-processing settings to alter the appearance of images captured thereby. Image-capture settings may be determined and applied before and/or while an image is captured, such as ISO, exposure time (also referred to as exposure, exposure duration, or shutter speed), aperture size, (also referred to as f/stop), focus, and gain (including analog and/or digital gain), among others. Moreover, image-processing settings can be configured for post-processing of an image, such as alterations to contrast, brightness, saturation, sharpness, levels, curves, and colors, among others.

A foveated image is an image with different resolutions in different regions within the image. For example, a foveated image may include a highest resolution in a region of interest (ROI) and lower-resolution regions around the ROI (e.g., in a "peripheral region").

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Systems and techniques are described for generating foveated image data. According to at least one example, a method is provided for generating foveated image data. The method includes: determining, by a first processor communicatively connected directly to an image sensor, an orientation of at least one eye of a user; storing, by the first processor, the indication of the orientation in a memory; and providing, from the first processor, an indication of the orientation to an image sensor; wherein the image sensor is configured to capture a foveated image based on the indication of the orientation, the foveated image comprising a first portion and a second portion, wherein the first portion is based on the indication of the orientation and has a first resolution, and wherein the second portion has a second resolution that is lower than the first resolution.

In another example, an apparatus for generating foveated image data is provided that includes a memory; and a first processor communicatively connected directly to an image sensor and communicatively connected to the memory, the first processor configured to: determine an orientation of at least one eye of a user; store the indication of the orientation in the memory; and provide an indication of the orientation to the image sensor; wherein the image sensor is configured to capture a foveated image based on the indication of the orientation, the foveated image comprising a first portion and a second portion, wherein the first portion is based on the indication of the orientation and has a first resolution, and wherein the second portion has a second resolution that is lower than the first resolution.

In another example, a non-transitory computer-readable medium is provided that has stored thereon instructions that, when executed by one or more processors, cause the one or more processors to: determine an orientation of at least one eye of a user; store the indication of the orientation in a memory; and provide an indication of the orientation to an image sensor; wherein the image sensor is configured to capture a foveated image based on the indication of the orientation, the foveated image comprising a first portion and a second portion, wherein the first portion is based on the indication of the orientation and has a first resolution, and wherein the second portion has a second resolution that is lower than the first resolution.

In another example, an apparatus for generating foveated image data is provided. The apparatus includes: means for determining an orientation of at least one eye of a user; means for storing the indication of the orientation in a memory; and means for providing an indication of the orientation to an image sensor; wherein the image sensor is configured to capture a foveated image based on the indication of the orientation, the foveated image comprising a first portion and a second portion, wherein the first portion is based on the indication of the orientation and has a first resolution, and wherein the second portion has a second resolution that is lower than the first resolution.

In some aspects, one or more of the apparatuses described herein is, can be part of, or can include an extended reality device (e.g., a virtual reality (VR) device, an augmented reality (AR) device, or a mixed reality (MR) device), a vehicle (or a computing device, system, or component of a vehicle), a mobile device (e.g., a mobile telephone or so-called "smart phone", a tablet computer, or other type of mobile device), a smart or connected device (e.g., an Internet-of-Things (IoT) device), a wearable device, a personal computer, a laptop computer, a video server, a television (e.g., a network-connected television), a robotics device or system, or other device. In some aspects, each apparatus can include an image sensor (e.g., a camera) or multiple image sensors (e.g., multiple cameras) for capturing one or more images. In some aspects, each apparatus can include one or more displays for displaying one or more images, notifications, and/or other displayable data. In some aspects, each apparatus can include one or more speakers, one or more light-emitting devices, and/or one or more microphones. In some aspects, each apparatus can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures:

FIG. 11 is a flow diagram illustrating an example process for generating foveated image data, in accordance with aspects of the present disclosure;

FIG. 12 is a flow diagram illustrating an example process for generating foveated image data, in accordance with aspects of the present disclosure;

DETAILED DESCRIPTION

Figure 1:
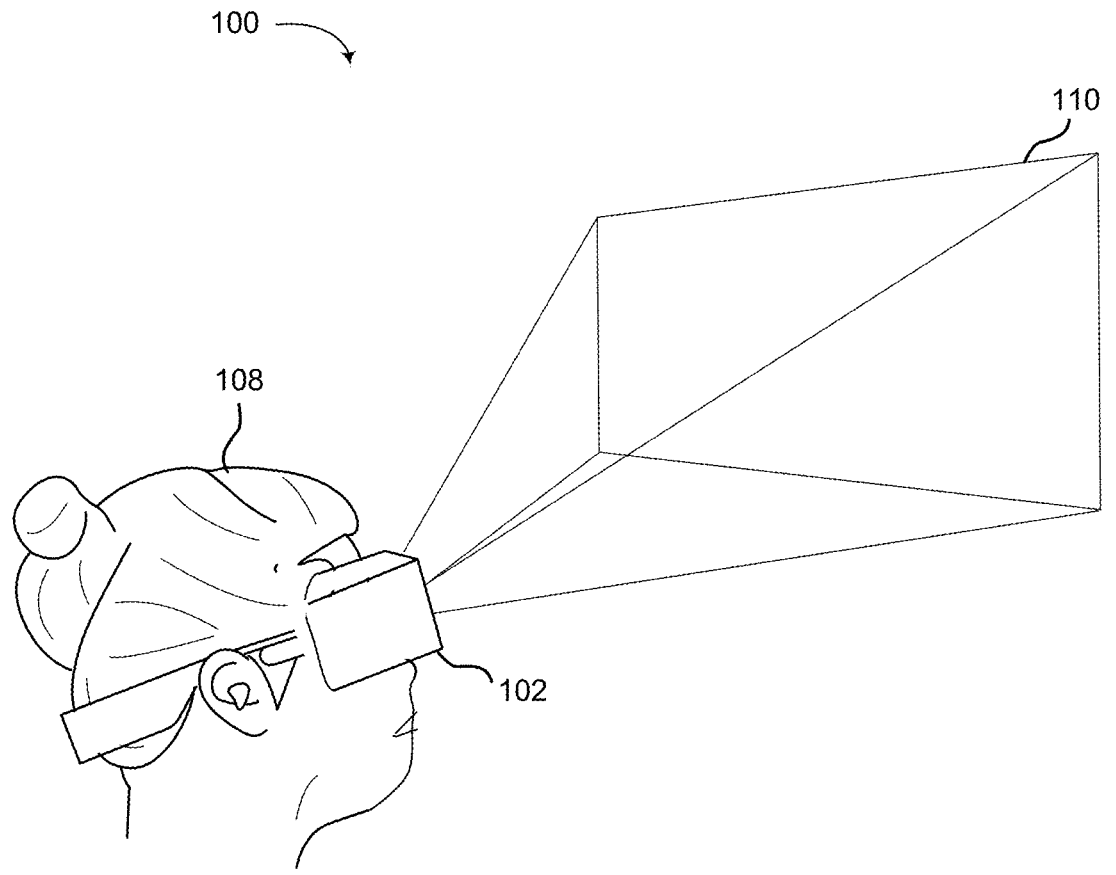
FIG. 1 is a diagram illustrating an example extended-reality (XR) system, according to aspects of the disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

A foveated image is an image with different resolutions in different regions within the image. For example, a foveated image may include a highest resolution in a region of interest (ROI) and one or more lower-resolution regions around the ROI (e.g., in "peripheral regions"). Some foveated images may include one peripheral region, for example, surrounding the ROI. Other foveated images may include several tiered peripheral regions, for example, a first peripheral region surrounding the ROI and a second peripheral region surrounding the first peripheral region.

Some devices may capture, modify, and/or render foveated images based on a gaze of a user. For example, some devices may determine where a viewer is gazing within an image frame and determine an ROI for a foveated image based on the gaze. The device may then capture, modify, and/or render image data (e.g., foveated image data) to have the highest resolution in the ROI and lower resolution outside the ROI (e.g., at "peripheral regions").

For example, a foveated-image sensor can be configured to capture a first image of an ROI of a field of view in high resolution. The first image may be referred to as a "fovea region" or an "ROI." The foveated-image sensor may also capture another image of the full field of view at a lower resolution. The portion of the lower-resolution image that is outside the ROI may be referred to as the peripheral region. As another example, a foveated-image image sensor may capture a foveated image in which the ROI as the high resolution and the peripheral region has the lower resolution. Additionally or alternatively, a processor can generate a foveated image including an ROI at a higher resolution and a peripheral region at a lower resolution.

Extended reality (XR) may include virtual reality (VR), augmented reality (AR), and/or mixed reality (MR). Some XR head-mounted devices (HMDs) may implement video see through (VST). In VST, an XR HMD may capture images of a field of view of a user and display the images to the user as if the user were viewing the field of view directly. While displaying the images of the field of view, the XR HMD may alter or augment the images providing the user with an altered or augmented view of the environment of the user (e.g., providing the user with an XR experience).

Foveated-image capture may be useful in VST because foveated-image capture may allow an XR HMD to conserve computational resources (e.g., power, processing time, communication bandwidth etc.). A foveated image of a field of view may be smaller in data size than a full-resolution image of the same field of view because the peripheral region may have lower resolution and may be stored using less data. Thus, capturing, storing, processing, and/or displaying a foveated image in VST rather than a full-resolution image may conserve computational resources.

One technique for implementing foveated imaging (e.g., for VST) may involve capturing images of eyes of a user (e.g., using one or more user-facing cameras), processing the images (e.g., using an image signal processor (ISP)), storing the processed images in a buffer (e.g., in a memory, such as a random-access memory (RAM)), reading the processed images from the buffer at a processor (e.g., a central processing unit (CPU)), tracking and/or predicting an orientation of the eyes of the user using the processor, relating the orientation of the eyes of the user to a field of view of a scene-facing camera to determine an ROI, providing an indication of the ROI from the processor to a foveated-image sensor, and capturing foveated image data at the foveated-image sensor based on the ROI.

Systems, apparatuses, methods (also referred to as processes), and computer-readable media (collectively referred to herein as "systems and techniques") are described herein for using eye-tracking data in foveated-image sensing. In contrast to the foveated imaging technique described above, the systems and techniques described herein may determine an ROI using an eye tracker (which may include a user-facing camera and/or an ISP) and provide an indication of the ROI to the foveated-image sensor (e.g., directly). For example, rather than writing images of the eye to the memory, reading the images of the eye from memory, processing the images at a processor to determine the ROI, and providing the ROI to the foveated-image sensor (according to the foveated imaging technique described above), the systems and techniques described herein can determine the ROI at the eye tracker and provide an indication of the ROI directly from the eye tracker to the foveated-image sensor. Then the foveated-image sensor may capture a foveated image based on the ROI. Alternatively, the systems and techniques may determine an orientation of eyes of the user at an eye tracker and provide an indication of the orientation of the eyes directly from the eye tracker to the foveated-image sensor. The foveated-image sensor may determine an ROI based on the indication of the orientation of the eyes and capture a foveated image based on the ROI.

Compared with a device that implements the foveated imaging technique described above, a device implementing the systems and techniques described herein can perform additional processing steps (e.g., determining the ROI) using an eye tracker (e.g., a user-facing camera and/or an ISP coupled to the user-facing camera) or using a foveated-image sensor. Additionally, a device implementing the techniques described herein may include an interface between the foveated-image sensor and the eye tracker. Additionally, the foveated-image sensor may be configured to capture images based on the ROI provided by the eye tracker or the ROI determined at the foveated-image sensor (e.g., rather than ROI data from a processor).

By determining an ROI at an eye tracker and providing an indication of the ROI to the foveated-image sensor from the eye tracker, or by providing an indication of the orientation of the eyes of the user from the eye tracker to the foveated-image sensor and determining the ROI at the foveated-image sensor, the systems and techniques may reduce a latency in providing the ROI to the foveated-image sensor (e.g., as compared with determining the ROI using a processor according to the foveated imaging technique described above). Reducing the latency in providing the ROI to the foveated-image sensor may allow the foveated-image sensor to generate foveated image data that is more synchronized with the eyes of the user.

For example, according to the foveated imaging technique described above, it may take 5 milliseconds (ms) to write image data from an ISP to a memory and to read the image data from the memory at a processor. It may take 5 ms to process the image data at the processor to determine the ROI and provide an indication of the ROI to the foveated-image sensor. According to the systems and techniques described herein, it may take 5 ms to determine the ROI at the eye tracker and to provide an indication of the ROI to the foveated-image sensor. Alternatively, it may take 5 ms to provide an indication of the orientation of the eyes of the user to the foveated-image sensor and for the foveated-image sensor to determine the ROI based on the orientation of the eyes. According to these example, the ROI received by the foveated-image sensor, or determined by the foveated-image sensor, according to the systems and techniques described herein may be 5 ms more current than the ROI received by the foveated-image sensor according to the foveated imaging technique described above.

More current ROI information may result in more accurate capturing of foveated images which may result in a better user experience. For example, in VST, a delay between when an image is captured at a scene-facing camera and when the image is displayed at a display of an XR device may be referred to a photon-to-photon latency. A photon-to-photon latency longer than 10 ms, for example, may be undesirable. For example, such a delay may cause dizziness or discomfort.

Additionally, the eye tracker may store images of the eyes, the indication of the orientation of the eyes, and/or the indication of the ROI in memory such that downstream services may use the images of the eyes, the orientation of the eyes, and/or the ROI. For example, an XR device may render image data for display based on the images of the eyes, the orientation of the eyes, and/or the ROI. Additionally or alternatively, the XR device may perform internal processing, such as last-stage rendering based on the stored images of the eyes, the orientation of the eyes, and/or the ROI. Additionally or alternatively, the XR device may prepare a display buffer based on the images of the eyes, the orientation of the eyes, and/or the ROI.

Various aspects of the application will be described with respect to the figures below.

FIG. 1 is a diagram illustrating an example extended-reality (XR) system 100, according to aspects of the disclosure. As shown, XR system 100 includes an XR device 102. XR device 102 may implement, as examples, image-capture, object-detection, gaze-tracking, view-tracking, localization, computational and/or display aspects of extended reality, including virtual reality (VR), augmented reality (AR), and/or mixed reality (MR). For example, XR device 102 may include one or more scene-facing cameras that may capture images of a scene in which user 108 uses XR device 102. XR device 102 may detect objects in the scene based on the images of the scene. Further, XR device 102 may include one or more user-facing cameras that may capture images of eyes of user 108. XR device 102 may determine a gaze of user 108 based on the images of user 108. XR device 102 may determine an object of interest in the scene based on the gaze of user 108. XR device 102 may obtain and/or render information (e.g., text, images, and/or video based on the object of interest). XR device 102 may display the information to a user 108 (e.g., within a field of view 110 of user 108).

XR device 102 may display the information to be viewed by a user 108 in field of view 110 of user 108. For example, in a "see-through" configuration, XR device 102 may include a transparent surface (e.g., optical glass) such that information may be displayed on (e.g., by being projected onto) the transparent surface to overlay the information onto the scene as viewed through the transparent surface. In a "pass-through" configuration or a "video see-through" configuration, XR device 102 may include a scene-facing camera that may capture images of the scene of user 108. XR device 102 may display images or video of the scene, as captured by the scene-facing camera, and information over-laid on the images or video of the scene.

In various examples, XR device 102 may be, or may include, a head-mounted device (HMD), a virtual reality headset, and/or smart glasses. XR device 102 may include one or more cameras, including scene-facing cameras and/or user-facing cameras, a graphics processing unit (GPU), one or more sensors (e.g., such as one or more inertial measurement units (IMUs), image sensors, and/or microphones), and/or one or more output devices (e.g., such as speakers, display, and/or smart glass).

In some aspects, XR device 102 may be, or may include, two or more devices. For example, XR device 102 may include a display device and a processing device. The processing device may receive data from the display device, such as image data (e.g., from user-facing cameras and/or scene-facing cameras) and/or motion data (from an inertial measurement unit (IMU)). The processing device may process the data and/or other data. Further the processing unit may generate data to be displayed at the display device. The processing device and the display device may be communicatively connected, for example, wirelessly.

Figure 2A:
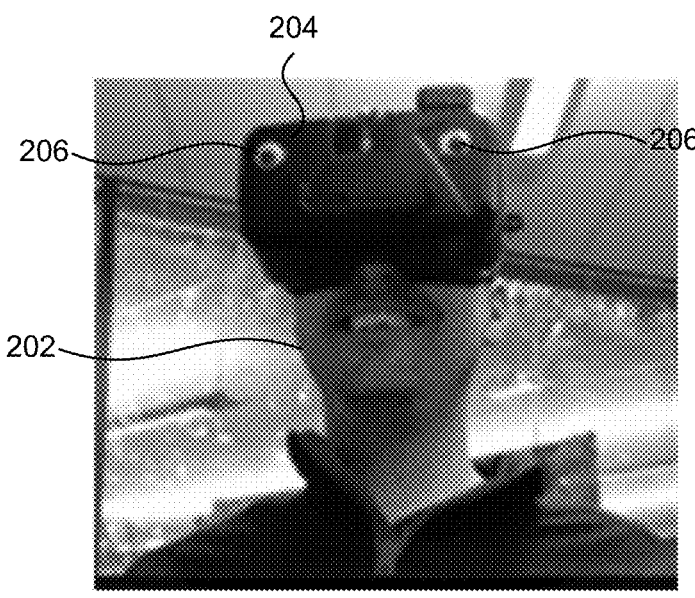
FIG. 2A is an illustration of a first view of a head-mounted device (HMD), according to various aspects of the present disclosure.

FIG. 2A is an illustration of a first view of a head-mounted device (HMD) 204, according to various aspects of the present disclosure. HMD 204 includes two scene-facing cameras 206. Scene-facing cameras 206 may capture images of a scene of a user 202 of HMD 204.

Figure 2B:
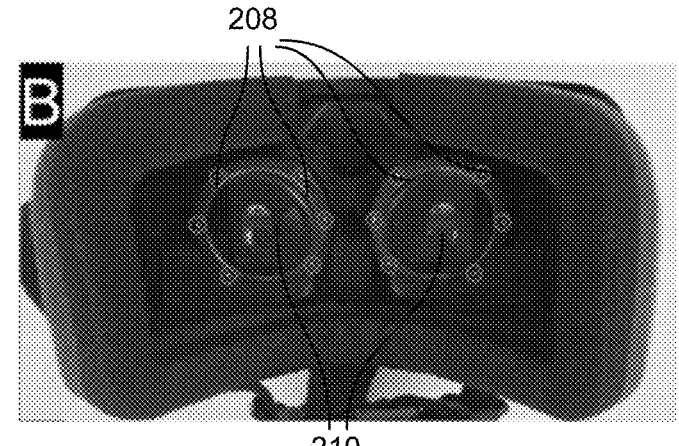
FIG. 2B is an illustration of a second view of the HMD of FIG. 2A, according to various aspects of the present disclosure.

FIG. 2B is an illustration of a second view of HMD 204, according to various aspects of the present disclosure. FIG. 2B illustrates displays 210. Displays 210 may be configured to be positioned proximate to eyes of user 202 when user 202 wears HMD 204 on a head of user 202. FIG. 2B further illustrates user-facing cameras 208. User-facing cameras 208 may be configured to be positioned with a view of eyes of user 202 when 202 wears HMD 204.

Figure 2C:
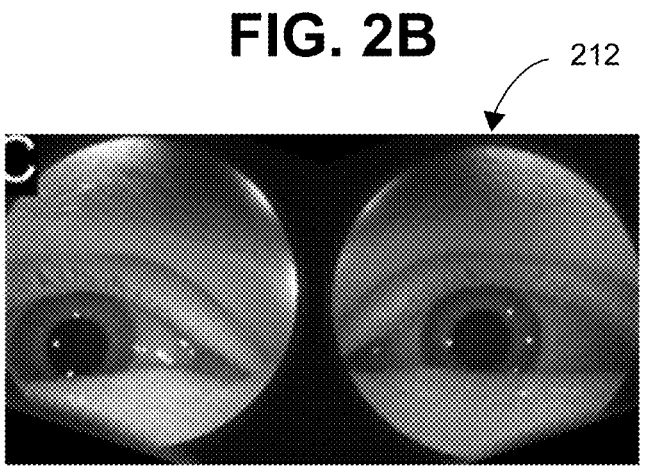
FIG. 2C is an illustration of example images of eyes of a user of the HMD of FIG. 2A, according to various aspects of the present disclosure.

FIG. 2C is an illustration of example images of eyes 212 of user 202, according to various aspects of the present disclosure. User-facing cameras 208 may capture images of eyes 212 of eyes of user 202 while user 202 is wearing HMD 204.

HMD 204 may determine an orientation of eyes of user 202 based on images of eyes 212. Further, in some aspects, HMD 204 may determine a gaze of user 202 relative to displays 210 based on images of eyes 212. For example, HMD 204 may determine where, within displays 210, or within an image displayed by displays 210, user 202 is gazing. Additionally or alternatively, HMD 204 may determine a gaze of user 202 relative to a scene. For example, displays 210 may display images of a scene, for example, as captured by scene-facing camera 206. The images of the scene may be altered or augmented to provide an XR experience. HMD 204 may determine where in the scene user 202 is gazing based on images of eyes 212.

HMD 204 is illustrated in FIG. 2A and FIG. 2B as being configured to occlude an entirety of a field of view of user 202. Alternative HMDs may include one or more clear screens that may allow user 202 to view a scene of user 202 through the screens. Such alternative HMDs may include scene-facing cameras 206, user-facing cameras 208, and displays 210 (such displays 210 may be at least partially transparent). Such alternative HMDs may determine a gaze of user 202 relative to displays and/or relative to a scene of the user based on images captured by user-facing cameras 208.

Figure 3:
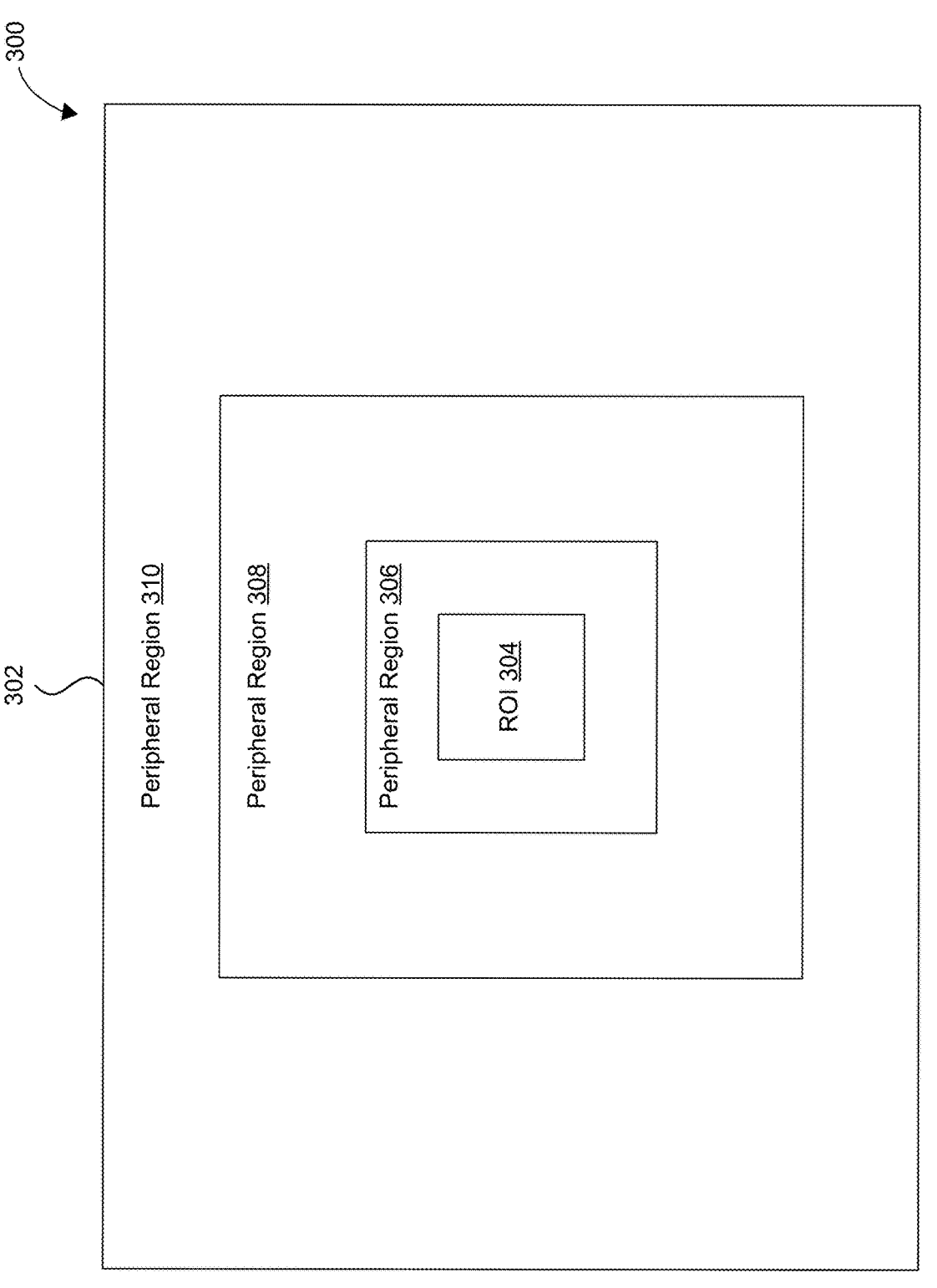
FIG. 3 is an illustration illustrating an example foveated image, according to various aspects of the present disclosure.

FIG. 3 is an illustration illustrating an example foveated image 300, according to various aspects of the present disclosure. Foveated image 300 has an image frame 302;

further foveated image 300 includes an example region of interest (ROI) 304 and several example peripheral regions (e.g., a peripheral region 306, a peripheral region 308, and a peripheral region 310).

Image frame 302 may represent a full field of view of a camera. Image frame 302 may be based on an image sensor, for example, based on the size and shape of the image sensor and/or based on optical components (e.g., lenses) that focus light onto the image sensor.

ROI 304 may represent a region determined to be of interest. ROI 304 may be of any shape or size. In some aspects, a foveated image may include multiple ROIs. ROI 304 may have the highest resolution of foveated image 300.

The example foveated image 300 includes three tiered peripheral regions. For example, foveated image 300 includes a peripheral region 306 that may surround ROI 304. Peripheral region 306 may have a second-highest resolution of foveated image 300. Peripheral region 306 surrounds peripheral region 306 and may have a third-highest resolution of foveated image 300. Peripheral region 310 may be a remainder of foveated image 300 and may have the lowest resolution of foveated image 300.

Figure 4:
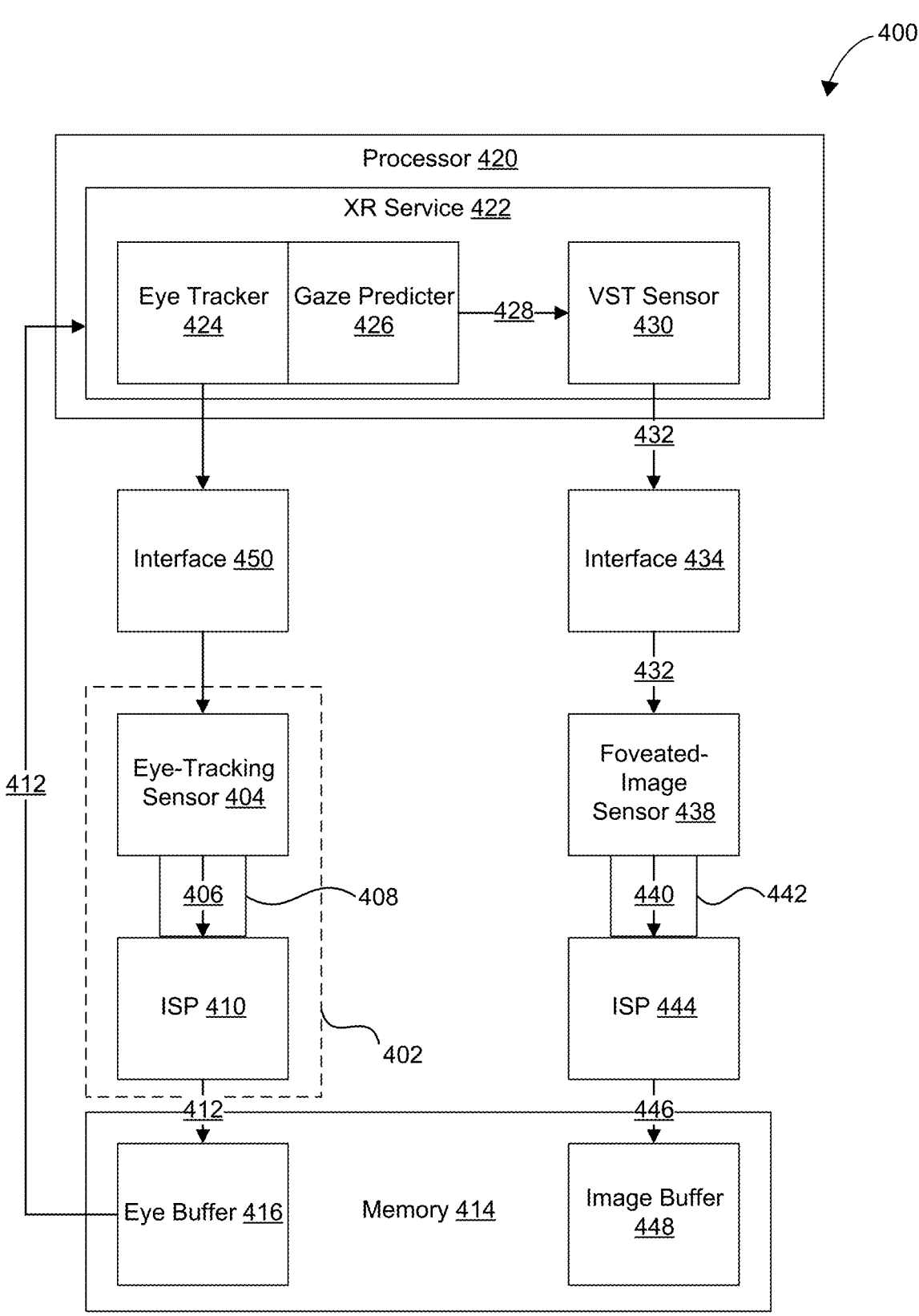
FIG. 4 is a block diagram illustrating an example system that may generate foveated image data.

FIG. 4 is a block diagram illustrating an example system 400 that may generate foveated image data. In general, an eye tracker 402 of system 400 may capture an image of one or more eye(s) 412 of a user (e.g., images of eyes 212 of FIG. 2C). Eye tracker 402 may store image of eye(s) 412 in an eye buffer 416 of a memory 414. An extended reality (XR) service 422, implemented at processor 420, may read image of eye(s) 412 from eye buffer 416. An eye tracker 424 of XR service 422 that may determine a region of interest (ROI) based on image of eye(s) 412. XR service 422 may provide an indication of the ROI (e.g., ROI data 432) from processor 420 to a foveated-image sensor 438 and foveated-image sensor 438 may capture images of a scene of the user based on the determined ROI.

Eye tracker 402 may be, or may include, eye-tracking sensor 404 and/or image signal processor (ISP) 410. Eye-tracking sensor 404 may be, or may include, one or more cameras configured to capture image of eye(s) 406 of a user, such as user-facing cameras 208 of FIG. 2B. Eye-tracking sensor 404 may also include one or more light sources to illuminate the eyes (e.g., using infrared electromagnetic radiation). Eye-tracking sensor 404 may generate image of eye(s) 412 based on electromagnetic radiation outside the spectrum visible light, for example, eye-tracking sensor 404 may generate image of eye(s) 406 based on infrared light.

ISP 410 may be, or may include, a processor configured to process image of eye(s) 406 to generate image of eye(s) 412. ISP 410 may denoise, among other tasks, image of eye(s) 406 to generate image of eye(s) 412. There may be an interface 408 between eye-tracking sensor 404 and ISP 410. Interface 408 may be, or may include, a physical-layer interface (PHY).

Memory 414 may be, or may include, any suitable means of storing data, for example, a random-access memory (RAM). Memory 414 may include partitions or buffers allocated for different categories of data. For example, memory 414 may include an eye buffer 416 designated to store image of eye(s) 412. For instance, there may be a memory address, or range of addresses, in which eye tracker 402 writes image of eye(s) 412 and from which processor 420 reads image of eye(s) 412.

Processor 420 may be, or may include, a general-purpose processor, a central processing unit (CPU), a graphics processing unit (GPU), or another processor. XR service 422 may be a software-defined service running on processor 420. XR service 422 may implement various aspects of XR applications.

Eye tracker 424 may be, or may include, a software-defined module running on processor 420, for example, as part of XR service 422. Eye tracker 424 may determine an ROI based on image of eye(s) 412. For example, eye tracker 424 may determine an orientation of the eyes based on image of eye(s) 412. Eye tracker 424 may relate the orientation of the eyes to displays (e.g., displays 210 of FIG. 2B) and/or to a scene of the user. Relating the orientation of the eyes to the displays and/or the scene may involve three-dimensional geometry and relating an orientation of the eyes in image plane of image of eye(s) 412 to an image plane of the displays. Additionally, eye tracker 424 may provide control signals to eye tracker 402 via an interface 450.

In some aspects, XR service 422 may implement a gaze predicter 426 that may predict an ROI. For example, in addition to tracking a gaze of the eyes (e.g., based on a most-recently-received instance of image of eye(s) 412), gaze predicter 426 may predict a gaze of the eyes for an upcoming time. Accurately predicting the gaze may decrease photon-to-photon latency of a video-see through (VST) system. Gaze predicter 426 may predict the gaze based on the current gaze and recent eye movements.

XR service 422 may implement a VST sensor 430 that may control foveated-image sensor 438. Eye tracker 424 or gaze predicter 426 may provide ROI data 428 (e.g., indicative of the determined ROI) to VST sensor 430 and VST sensor 430 may provide a control signal (ROI data 432) indicative of the ROI to foveated-image sensor 438 via an interface 434 (such a common client interface (CCI)).

Foveated-image sensor 438 may be a scene-facing camera (e.g., scene-facing camera 206 of FIG. 2A) and may capture image data 440. Image data 440 may be, or may include, a foveated image of a scene based on the ROI. In some aspects, foveated-image sensor 438 may capture a first image of the ROI (as indicated by ROI data 432) at a first resolution and a second image of the whole field of view of foveated-image sensor 438 at a second resolution. The first resolution may be higher than the second resolution. Image data 440 may be, or may include, the first and second images. Alternatively, image data 440 may be a composite of the two images, with the ROI at the first resolution and the remainder (e.g., the peripheral region) at the second resolution. In other aspects, foveated-image sensor 438 may capture an image with multiple different resolutions. For example, as foveated-image sensor 438 is capturing, storing, and/or reading out image data, foveated-image sensor 438 may capture, store, and/or read out the image data at multiple different resolutions, for example, a highest resolution for an ROI and lower resolutions for a peripheral region. Foveated image 300 of FIG. 3 may be an example of image data 440.

ISP 444 may be, or may include, a processor configured to process image data 440 to generate image data 446. ISP 444 may denoise, among other tasks, image data 440 to generate image data 446. There may be an interface 442 between foveated-image sensor 438 and ISP 444. Interface 442 may be, or may include, a physical-layer interface (PHY). ISP 444 may store image data 446 in memory 414, for example, at an image buffer 448 allocated for image data 440.

System 400 may exhibit latency. For example, storing image of eye(s) 412 at eye buffer 416 and reading image of eye(s) 412 from eye buffer 416 may cause latency.

Figure 5:
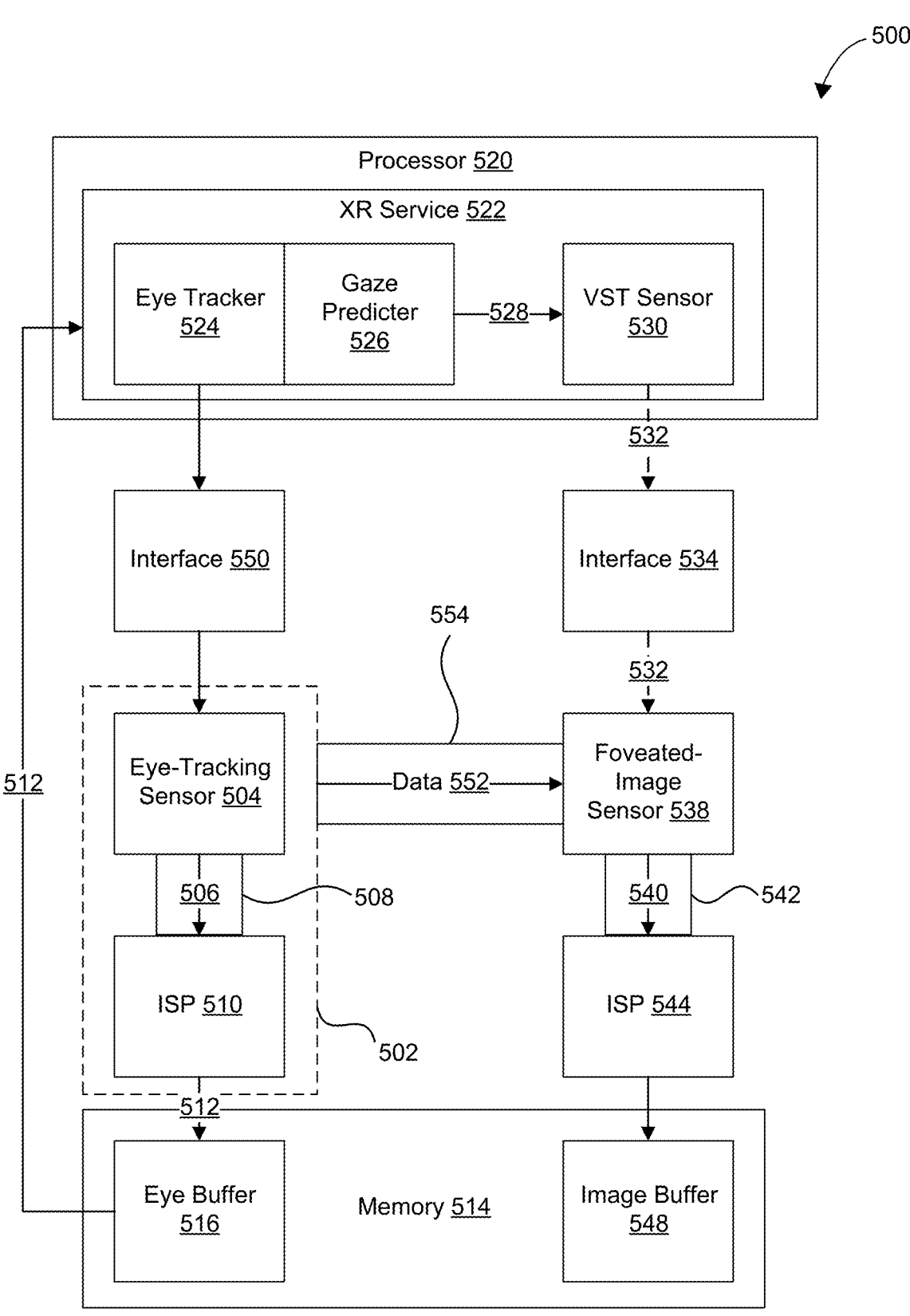
FIG. 5 is a block diagram illustrating an example system that may generate foveated image data, according to various aspects of the present disclosure.

FIG. 5 is a block diagram illustrating an example system 500 that may generate foveated image data, according to various aspects of the present disclosure. In general, an eye tracker 502 of system 500 may capture an image of one or more eye(s) 512 of a user (e.g., images of eyes 212 of FIG. 2C). Eye tracker 502 may provide data 552 to a foveated-image sensor 538 via an interface 554 and foveated-image sensor 538 may capture images of a scene of the user based on data 552.

Eye tracker 502 may be, or may include, eye-tracking sensor 504 and/or image signal processor (ISP) 510. Eye-tracking sensor 504 may be similar to eye-tracking sensor 404 of FIG. 4. For example, eye-tracking sensor 504 may capture image of eye(s) 506 of a user. ISP 510 may be similar to ISP 410 of FIG. 4. For example, ISP 410 may denoise, among other tasks, image of eye(s) 506 to generate image of eye(s) 512. There may be an interface 508 between eye-tracking sensor 504 and ISP 510. Interface 508 may be similar to interface 408 of FIG. 4. Foveated-image sensor 638 may be similar to foveated-image sensor 538 of FIG. 4. For example, foveated-image sensor 638 may generate image data 540 based on an ROI. Foveated image 300 of FIG. 3 may be an example of image data 540.

In contrast to eye tracker 402 of FIG. 4, eye tracker 502 may generate data 552 and provide data 552 to foveated-image sensor 538 using interface 554. Further, foveated-image sensor 538 may generate image data 540 based on data 552. In this way, system 500 may bypass writing image of eye(s) 512 to eye buffer 516, reading image of eye(s) 512 from eye buffer 516, and processing eye buffer 516 at processor 520 to generate ROI data 532. As will be explained below, image of eye(s) 512 may still be written to eye buffer 516, read from eye buffer 516, and processed at processor 520. However, foveated-image sensor 538 may capture image data 540 based on data 552 which may save time and decrease the latency of system 500 compared with the latency of system 400.

Data 552 may be data indicative of an ROI or data indicative of an orientation of eyes of a user. Data 552 may be generated by eye-tracking sensor 504 and/or ISP 510. Interface 554 may be, or may include, a direct communicative connection between eye tracker 502 and foveated-image sensor 538. In some aspects, interface 554 may be a direct communicative connection between eye-tracking sensor 504 and foveated-image sensor 538. In other aspects, interface 554 may be a direct communicative connection between ISP 510 and foveated-image sensor 538. In still other aspects, interface 554 may be a direct communicative connection between eye-tracking sensor 504 and ISP 510 and foveated-image sensor 538.

Figure 6:
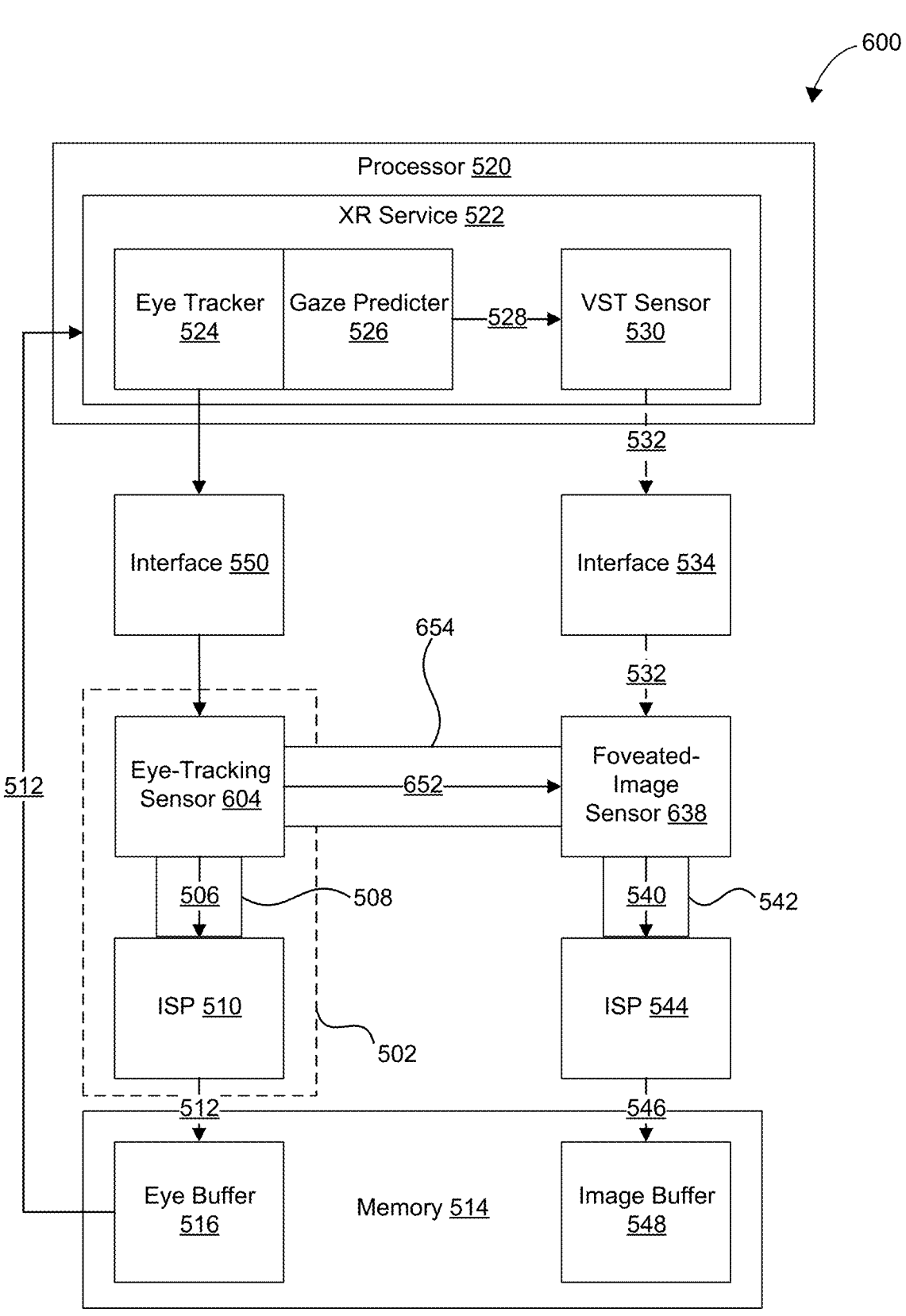
FIG. 6 is a block diagram illustrating another example system that may generate foveated image data, according to various aspects of the present disclosure.

FIG. 6, FIG. 7, FIG. 8, FIG. 9, and FIG. 10 illustrate five respective example aspects of the present disclosure. For example, FIG. 6 is a block diagram illustrating an example system 600 that may generate foveated image data, according to various aspects of the present disclosure. According to the example aspect of system 600 of FIG. 6, eye-tracking sensor 604 may capture an image of eyes of a user. Further, eye-tracking sensor 604 may determine a region of interest based on the image of the eyes of the user and generate ROI data 652 based on the determined ROI. Eye-tracking sensor 604 may provide ROI data 652 to foveated-image sensor 638 (e.g., directly using interface 654) and foveated-image sensor 638 may capture image data 540 based on the determined ROI (as indicated by ROI data 652).

ROI data 652 may be, or may include, a number of regions of interest and, for each region of interest, pixel coordinates indicative of the position of the region of interest. For example, ROI data 652 may include x and y pixel coordinates indicative of the ROI. The x and y coordinates may be according to coordinates of foveated-image sensor 638. For example, the x and y coordinates may be relative to image data 540. For example, using foveated image 300 of FIG. 3 as an example of image data 540, ROI data 652 may indicate x and y coordinates describing ROI 304 of FIG. 3. ROI data 652 may indicate a center of the ROI and a size (e.g., a radius or height and/or width) of the ROI. Alternatively, ROI data 652 may indicate one or more corners of the ROI and/or a size (e.g., height and/or width) of the ROI. Additionally, ROI data 652 may include an indication of an operational mode, for example, a scaling factor. For instance, ROI data 652 may include a ratio between the resolution of the ROI and other regions of image data 540.

In system 600, eye-tracking sensor 604 may perform operations similar to the operations performed by eye tracker 524 to determine the ROI based on an image of the eyes. Additionally or alternatively, eye-tracking sensor 604 may perform operations similar to the operations performed by gaze predictor 526 to predict the ROI based on an image of the eyes. Eye-tracking sensor 604 may be, or may include, a processor and/or logic circuits configured to perform such tasks.

Figure 7:
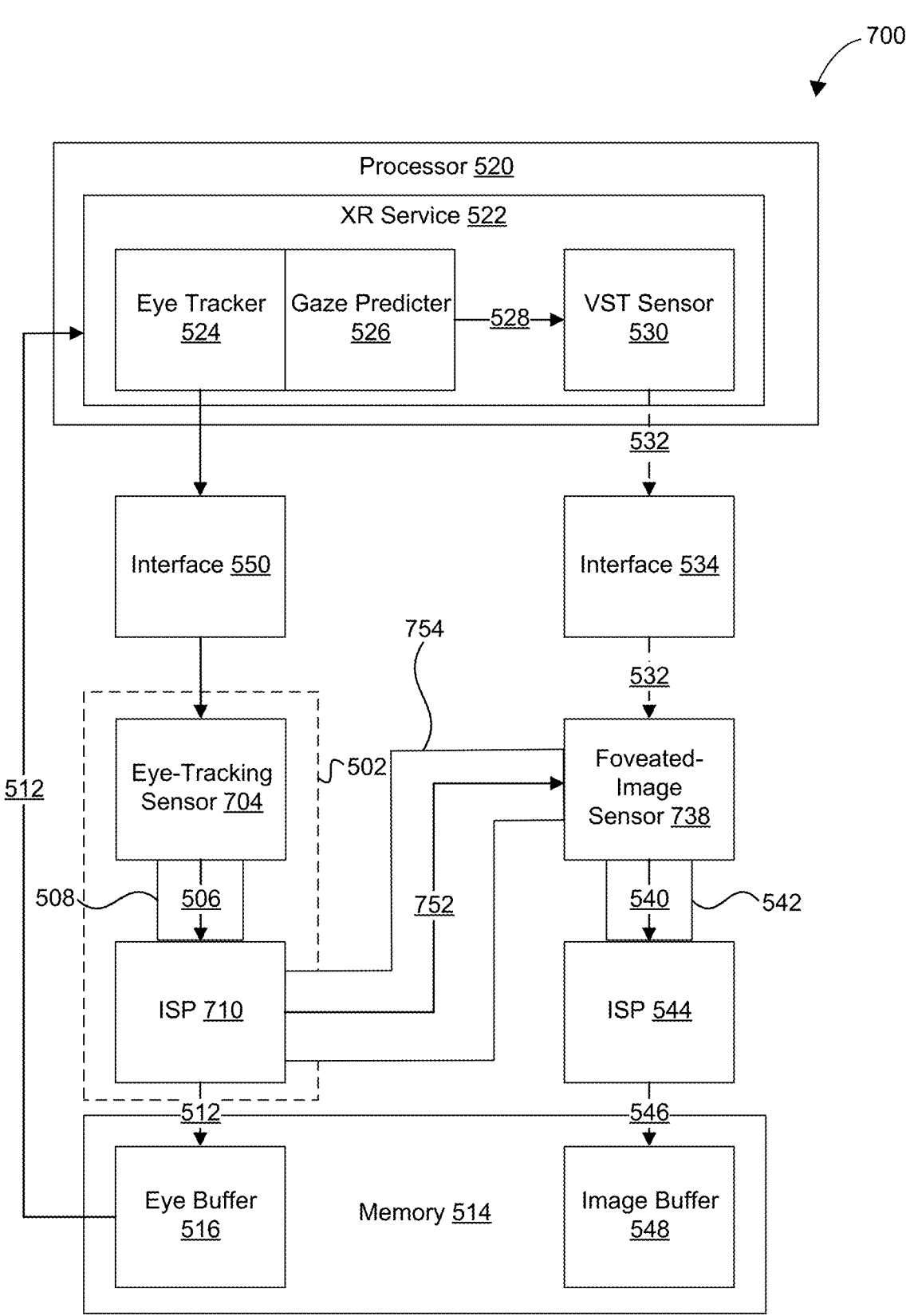
FIG. 7 is a block diagram illustrating yet another example system that may generate foveated image data, according to various aspects of the present disclosure.

FIG. 7 is a block diagram illustrating an example system 700 that may generate foveated image data, according to various aspects of the present disclosure. According to the example aspect of system 700 of FIG. 7, eye-tracking sensor 704 (which may be similar to eye-tracking sensor 404 of FIG. 4) may capture an image of eye(s) 506 of a user and provide image of eye(s) 506 to ISP 710. ISP 710 may determine a region of interest based on image of eye(s) 506 and generate ROI data 752 based on the determined ROI. ISP 710 may provide ROI data 752 to foveated-image sensor 738 (e.g., directly using interface 754) and foveated-image sensor 738 may capture image data 540 based on the determined ROI (as indicated by ROI data 752).

ROI data 752 may be similar to ROI data 652 of FIG. 6. For example, ROI data 752 may be, or may include, indications of the positions of ROIs (e.g., x and y pixel coordinates indicative of positions of the ROIs) and an indication of an operational mode.

In system 700, ISP 710 may perform operations similar to the operations performed by eye tracker 524 to determine the ROI based on an image of the eyes. Additionally or alternatively, ISP 710 may perform operations similar to the operations performed by gaze predictor 526 to predict the ROI based on an image of the eyes.

Figure 8:
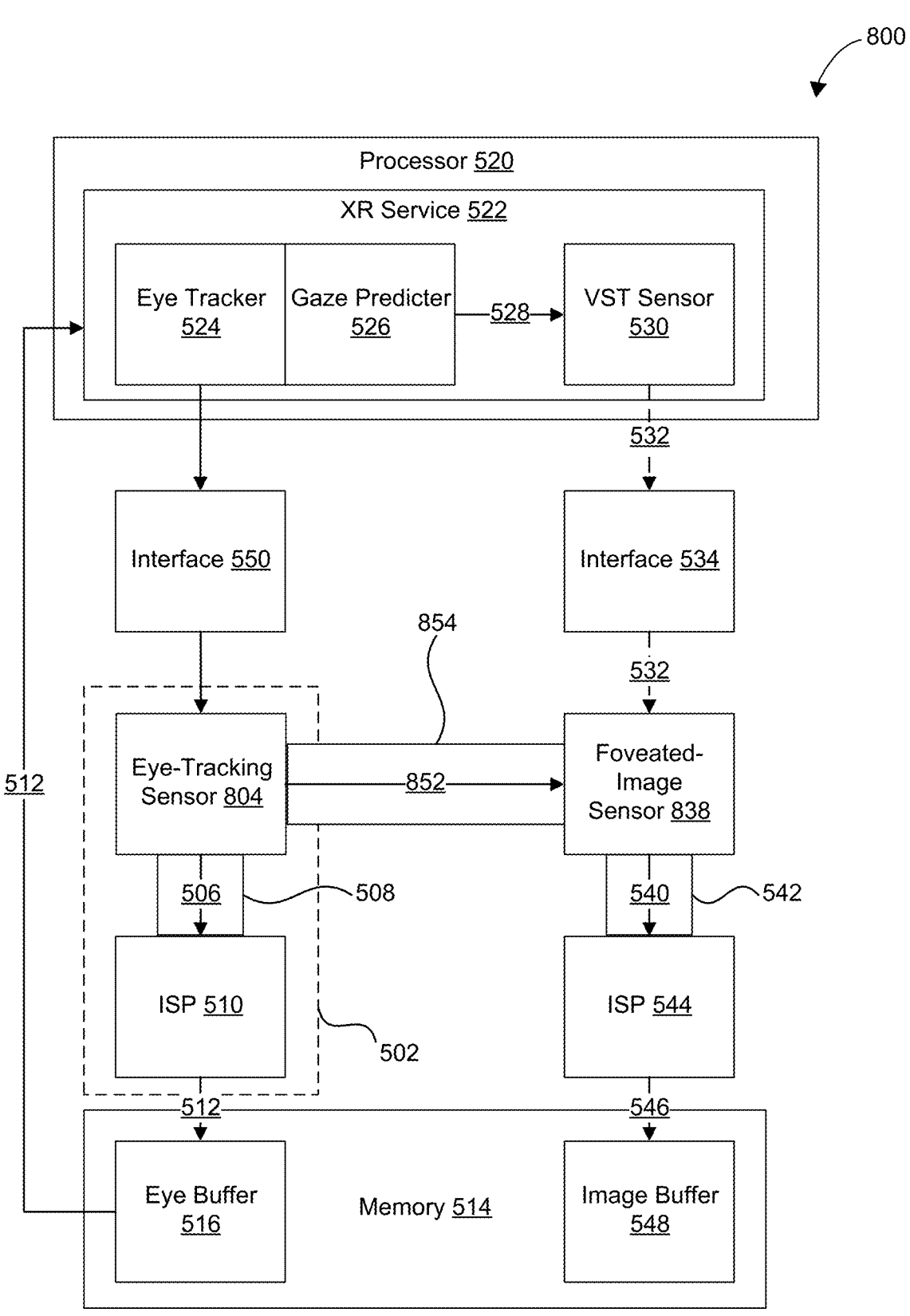
FIG. 8 is a block diagram illustrating yet another example system that may generate foveated image data, according to various aspects of the present disclosure.

FIG. 8 is a block diagram illustrating an example system 800 that may generate foveated image data, according to various aspects of the present disclosure. According to the example aspect of system 800 of FIG. 8, eye-tracking sensor 804 may capture an image of eyes of a user. Further, eye-tracking sensor 804 may determine an orientation of eyes of the user based on the image of the eyes of the user and generate eye data 852 based on the determined orientation. Eye-tracking sensor 804 may provide eye data 852 to foveated-image sensor 838 (e.g., directly using interface 854) and foveated-image sensor 838 may determine an ROI based on the orientation of the eyes of the user. Foveated-image sensor 838 capture image data 540 based on the determined ROI.

Eye data 852 may be, or may include, an eye location (e.g., x and y pixel coordinates indicative of an orientation of the eyes of the user). The x and y coordinates may be according to coordinates of eye-tracking sensor 804. For example, the x and y coordinates may be relative to an image of eyes of the user. Using images of eyes 212 of FIG. 2C as an example, eye data 852 may indicate a location of a center of a pupil. Additionally, eye data 852 may include an accuracy of eye tracking (e.g., radius of an eye). For example, eye data 852 may include a confidence regarding the eye location.

In system 800, foveated-image sensor 838 may perform operations similar to the operations performed by eye tracker 524 to determine the ROI based on an orientation of the eyes. Additionally or alternatively, foveated-image sensor 838 may perform operations similar to the operations performed by gaze predictor 526 to predict the ROI based on the orientation of the eyes. Foveated-image sensor 838 may be, or may include, a processor and/or logic circuits configured to perform such tasks.

Figure 9:
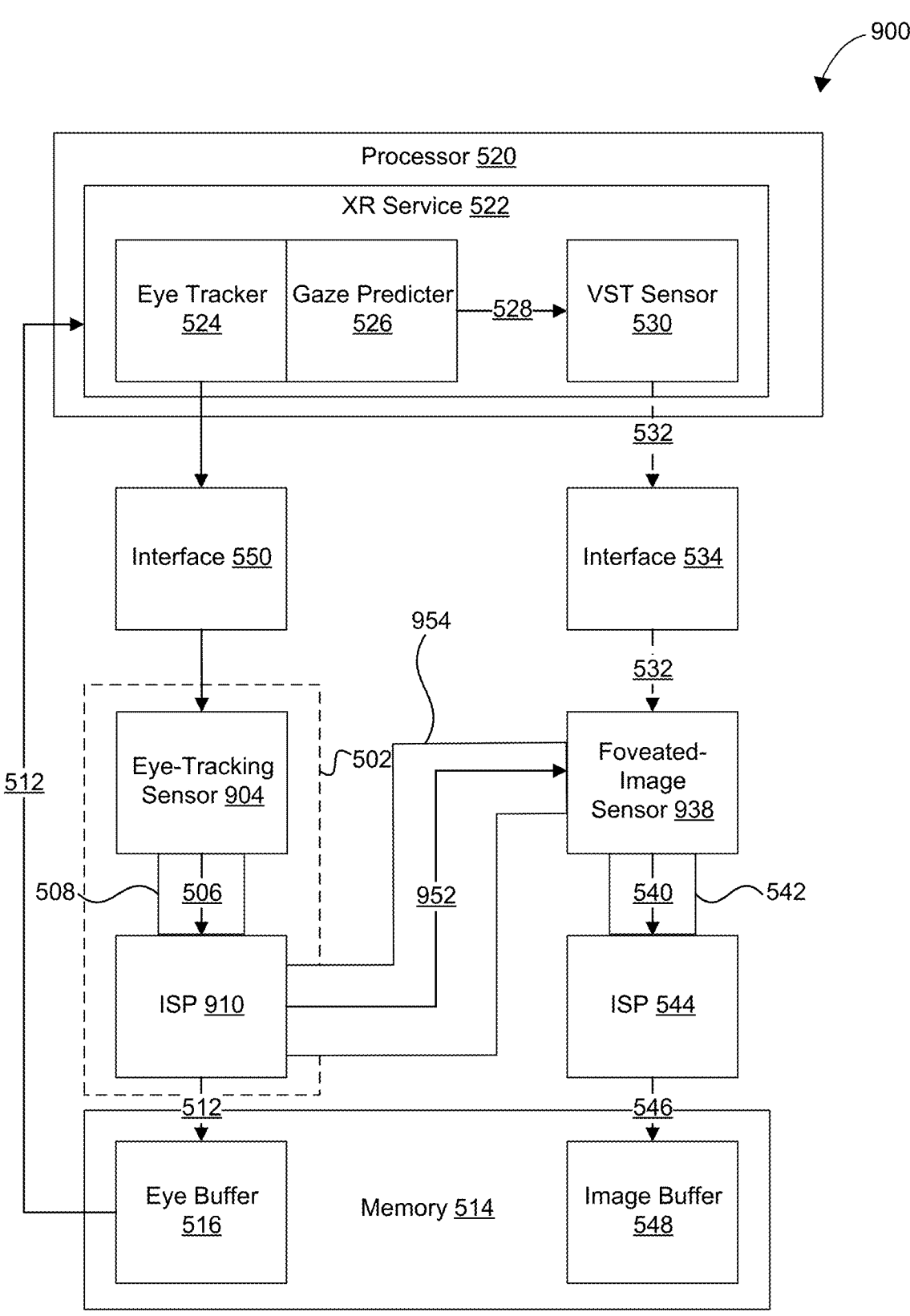
FIG. 9 is a block diagram illustrating yet another example system that may generate foveated image data, according to various aspects of the present disclosure.

FIG. 9 is a block diagram illustrating an example system 900 that may generate foveated image data, according to various aspects of the present disclosure. According to the example aspect of system 900 of FIG. 9, eye-tracking sensor 904 (which may be similar to eye-tracking sensor 404 of FIG. 4) may capture an image of eye(s) 506 of a user and provide image of eye(s) 506 to ISP 910. ISP 910 may determine an orientation of eyes of the user based on image of eye(s) 506 and generate eye data 952 based on the determined orientation. ISP 910 may provide eye data 952 to foveated-image sensor 938 (e.g., directly using interface 954) and foveated-image sensor 938 may determine an ROI based on the orientation of the eyes of the user. Foveated-image sensor 938 capture image data 540 based on the determined ROI.

Eye data 952 may be similar to eye data 852 of FIG. 8. For example, eye data 952 may include an eye location and an accuracy of eye tracking (e.g., radius of an eye).

In system 900, foveated-image sensor 938 may perform operations similar to the operations performed by eye tracker 524 to determine the ROI based on an orientation of the eyes. Additionally or alternatively, foveated-image sensor 938 may perform operations similar to the operations performed by gaze predictor 526 to predict the ROI based on the orientation of the eyes. Foveated-image sensor 938 may be, or may include, a processor and/or logic circuits configured to perform such tasks.

Figure 10:
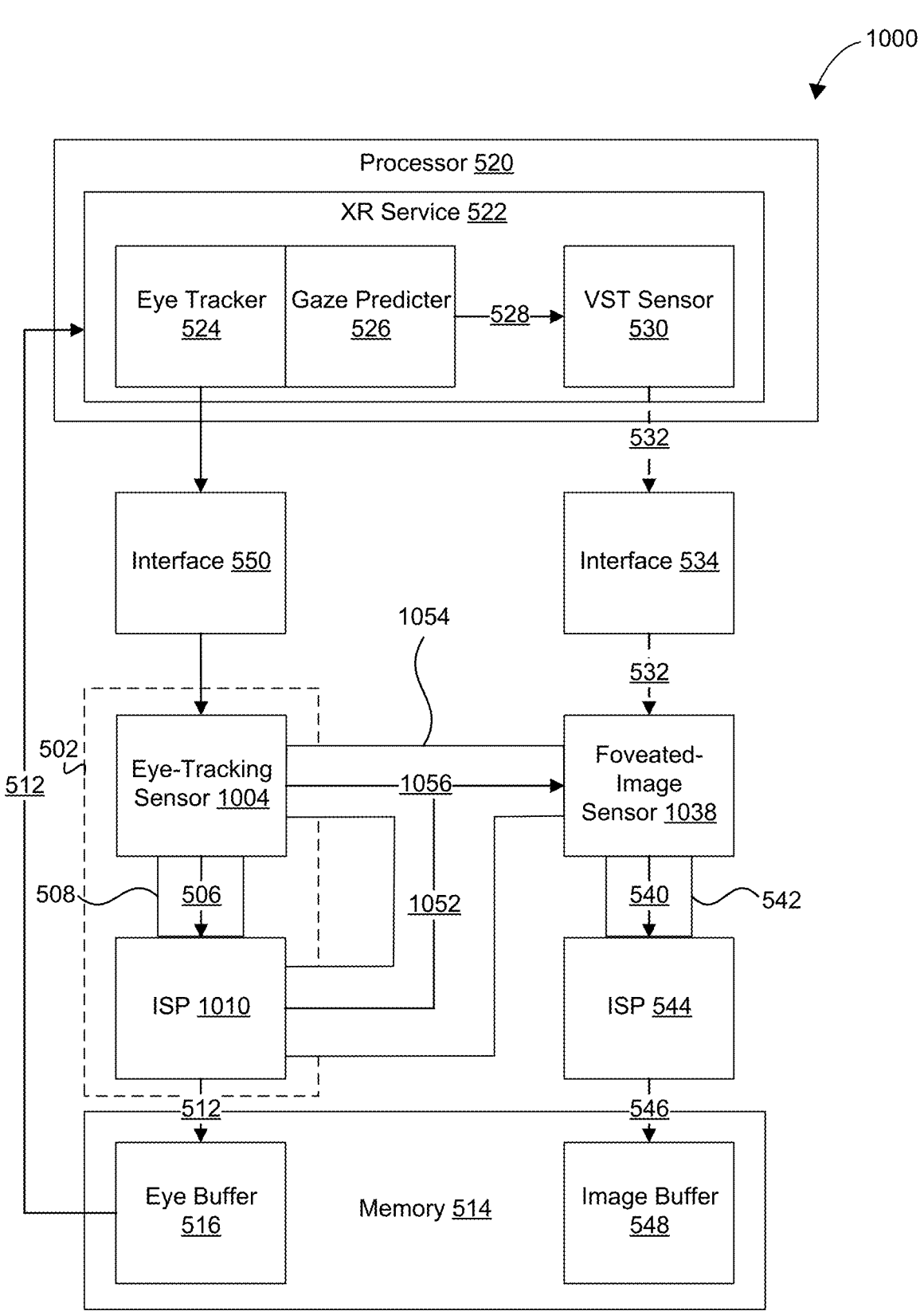
FIG. 10 is a block diagram illustrating yet another example system that may generate foveated image data, according to various aspects of the present disclosure.

FIG. 10 is a block diagram illustrating an example system 1000 that may generate foveated image data, according to various aspects of the present disclosure. System 1000 is a hybrid including one or more elements of, and/or performing one or more tasks described with regard to system 600 of FIG. 6, system 700 of FIG. 7, system 800, of FIG. 8, and/or system 900 of FIG. 9.

According to the example aspect of system 1000 of FIG. 10, eye-tracking sensor 1004 may capture an image of eye(s) 506 of a user and provide image of eye(s) 506 to ISP 1010. Eye-tracking sensor 1004 may provide data 1056 to foveated-image sensor 1038 via interface 1054 and ISP 1010 may provide data 1052 to foveated-image sensor 1038 via interface 1054. Foveated-image sensor 1038 may generate image data 540 based on data 1056 and data 1052.

In some aspects, data 1056 and data 1052 may be, or may include, ROI data (e.g., similar to ROI data 652 of FIG. 6 and ROI data 752 of FIG. 7). In such cases, eye-tracking sensor 1004 and/or ISP 1010 may determine an ROI based on image of eye(s) 506 and provide data 1056 and data 1052 as an indication of the ROI to foveated-image sensor 1038. Foveated-image sensor 1038 may generate image data 540 based on the ROI indicated by data 1056 and/or data 1052.

In other aspects, data 1056 and data 1052 may be, or may include, eye data (e.g., similar to eye data 852 of FIG. 8 and eye data 952 of FIG. 9). In such cases, eye-tracking sensor 1004 and/or ISP 1010 may determine an orientation of eyes of a user based on image of eye(s) 506 and provide an indication of the orientation of the eyes to foveated-image sensor 1038. Foveated-image sensor 1038 may determine an ROI based on the orientation of the eyes and generate image data 540 based on the ROI.

In each of FIG. 5, FIG. 6, FIG. 7, FIG. 8, FIG. 9, and FIG. 10, many elements may be the same as, may be substantially similar to, and/or may perform the same, or substantially the same, operations as the corresponding elements of FIG. 4. For example, each of eye-tracking sensor 504, eye-tracking sensor 604, eye-tracking sensor 704, eye-tracking sensor 804, eye-tracking sensor 904, and eye-tracking sensor 1004 may generate a respective instance of image of eye(s) 506 and provide the respective instance of image of eye(s) 506 to a corresponding one of ISP 510 of FIG. 5, ISP 510 of FIG. 6, ISP 710 of FIG. 7, ISP 510 of FIG. 8, ISP 910 of FIG. 9, or ISP 1010 of FIG. 10 via a respective instance of interface 508. Additionally, eye-tracking sensor 504 may generate at least a part of data 552 and provide the at least a part of data 552 to foveated-image sensor 538 via interface 554. Similarly, eye-tracking sensor 604 may generate ROI data 652 and provide ROI data 652 to foveated-image sensor 638 via interface 654 and eye-tracking sensor 804 may generate eye data 852 and provide eye data 852 to foveated-image sensor 838 via interface 854.

Each of ISP 510 of FIG. 5, ISP 510 of FIG. 6, ISP 710 of FIG. 7, ISP 510 of FIG. 8, ISP 910 of FIG. 9, or ISP 1010 of FIG. 10 may process the respective instance of image of eye(s) 506 to generate a respective instance of image of eye(s) 512. For example, ISP 510, ISP 710, ISP 910, and/or ISP 1010 may denoise instances of image of eye(s) 506 to generate instances of image of eye(s) 512. Additionally, ISP 510 may generate at least a part of data 552 and provide the at least a part of data 552 to foveated-image sensor 538 via interface 554. Similarly, ISP 710 may generate ROI data 752 and provide ROI data 752 to foveated-image sensor 738 via interface 754 and ISP 910 may generate eye data 952 and provide eye data 952 to foveated-image sensor 938 via interface 954.

In each of FIG. 5, FIG. 6, FIG. 7, FIG. 8, FIG. 9, and FIG. 10, system 500, system 600, system 700, system 800, system 900, and system 1000 may store image of eye(s) 512 in eye buffer 516 of memory 514. Additionally or alternatively, in some aspects, system 500 may store data 552 in memory 514, system 600 may store ROI data 652 in memory 514, system 700 may store ROI data 752 in memory 514, system 800 may store eye data 852 in memory 514, system 900 may store eye data 952 in 914, and/or system 1000 may store data 1052 in memory 514.

Processor 520 may implement XR service 522. XR service 522 may include eye tracker 524 and gaze predictor 526. Processor 520 may read image of eye(s) 512 from eye buffer 516. Additionally or alternatively, processor 520 may read data 552, ROI data 652, ROI data 752, eye data 852, eye data 952, and/or data 1052 from memory 514.

XR service 522 may determine ROI data 528 (e.g., using eye tracker 524 and/or gaze predictor 526) even though foveated-image sensor 538, foveated-image sensor 638, foveated-image sensor 738, foveated-image sensor 838, foveated-image sensor 938, and foveated-image sensor 1038 may receive data 552, ROI data 652, ROI data 752, eye data 852, eye data 952, data 1052 respectively. Similarly, XR service 522 may determine ROI data 528 (e.g., using eye tracker 524 and/or gaze predictor 526) even though foveated-image sensor 538, foveated-image sensor 638, foveated-image sensor 738, foveated-image sensor 838, foveated-image sensor 938, and foveated-image sensor 1038 may capture respective instances of image data 540 based on data 552, ROI data 652, ROI data 752, eye data 852, eye data 952, data 1052 respectively. Other modules or operations within XR service 522 and/or running at processor 520 may use image of eye(s) 512, data 552, ROI data 652, ROI data 752, eye data 852, eye data 952, data 1052, and/or ROI data 528. For example, other modules or operations within XR service 522 and/or running at processor 520 may render image data, adjust image data, and/or display image data based on any of image of eye(s) 512, data 552, ROI data 652, ROI data 752, eye data 852, eye data 952, data 1052, and/or ROI data 528.

In each of FIG. 5, FIG. 6, FIG. 7, FIG. 8, FIG. 9, and FIG. 10, VST sensor 530 may, or may not, provide a control signal (ROI data 532) to foveated-image sensor 538, foveated-image sensor 638, foveated-image sensor 738, foveated-image sensor 838, foveated-image sensor 938, and foveated-image sensor 1038 via an interface 534. For example, VST sensor 530 may not provide ROI data 532 because foveated-image sensor 538, foveated-image sensor 638, foveated-image sensor 738, foveated-image sensor 838, foveated-image sensor 938, and foveated-image sensor 1038 may capture respective instances of image data 540 based on data 552, ROI data 652, ROI data 752, eye data 852, eye data 952, data 1052 respectively. Alternatively, in some aspects, VST sensor 530 may provide ROI data 532 to foveated-image sensor 538, foveated-image sensor 638, foveated-image sensor 738, foveated-image sensor 838, foveated-image sensor 938, and foveated-image sensor 1038 and foveated-image sensor 538, foveated-image sensor 638, foveated-image sensor 738, foveated-image sensor 838, foveated-image sensor 938, and foveated-image sensor 1038 may capture foveated image data 540 based on the both ROI data 532 and data 552, ROI data 652, ROI data 752, eye data 852, eye data 952, and data 1052 respectively. For example, in some aspects, foveated-image sensor 538 may determine two ROIs, one based on ROI data 532 and another based on data 552. As another example, foveated-image sensor 538 may determine one ROI large enough to include the ROI indicated by ROI data 532 and the ROI indicated by data 552.

Foveated-image sensor 538, foveated-image sensor 638, foveated-image sensor 738, foveated-image sensor 838, foveated-image sensor 938, and foveated-image sensor 1038 may capture respective instances of image data 540 based on data 552, ROI data 652, ROI data 752, eye data 852, eye data 952, data 1052 respectively and provide image data 540 to ISP 544 via interface 542. ISP 544 may process image data 540 to generate image data 546 and store image data 546 at image buffer 548 of memory 514.

FIG. 11 is a flow diagram illustrating an example process 1100 for generating foveated image data, in accordance with aspects of the present disclosure. One or more operations of process 1100 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the process 1100. The one or more operations of process 1100 may be implemented as software components that are executed and run on one or more processors.

At block 1102, a computing device (or one or more components thereof) may determine, at a processor communicatively connected directly to an image sensor, an orientation of at least one eye of a user. For example, eye-tracking sensor 504 of FIG. 5, eye-tracking sensor 604 of FIG. 6, eye-tracking sensor 804 of FIG. 8, or eye-tracking sensor 1004 of FIG. 10 may be, or may include, the processor of block 1102. Additionally or alternatively, ISP 510 of FIG. 5, ISP 710 of FIG. 7, ISP 910 of FIG. 9, or ISP 1010 of FIG. 10 may be, or may include, the processor of block 1102. Eye-tracking sensor 504 and/or ISP 510 may be directly connected to foveated-image sensor 538 of FIG. 5. Eye-tracking sensor 604 may be directly connected to foveated-image sensor 638 of FIG. 6. ISP 710 may be directly connected to foveated-image sensor 738 of FIG. 7. Eye-tracking sensor 804 may be directly connected to foveated-image sensor 838 of FIG. 8. ISP 910 of FIG. 9 may be directly connected to foveated-image sensor 938. Eye-tracking sensor 1004 and/or ISP 1010 may be directly connected to foveated-image sensor 1038 of FIG. 10. The processor of any of eye-tracking sensor 504, ISP 510, eye-tracking sensor 604, ISP 710, eye-tracking sensor 804, ISP 910, eye-tracking sensor 1004, or ISP 1010 may determine an orientation of an eye of a user. In some aspects, the processor of any of eye-tracking sensor 504, ISP 510, eye-tracking sensor 604, ISP 710, eye-tracking sensor 804, ISP 910, eye-tracking sensor 1004, or ISP 1010 may determine an ROI based on the orientation of the eye of the user.

At block 1104, the computing device (or one or more components thereof) may provide an indication of the orientation to the image sensor. For example, eye-tracking sensor 504 and/or ISP 510 may provide an indication of the orientation to foveated-image sensor 538. As another example, eye-tracking sensor 604 may provide an indication of the orientation to foveated-image sensor 638. As another example, ISP 710 may provide an indication of the orientation to foveated-image sensor 738. As another example, eye-tracking sensor 804 may provide an indication of the orientation to foveated-image sensor 838. As another example, ISP 910 may provide an indication of the orientation to foveated-image sensor 938. As another example, eye-tracking sensor 1004 and/or ISP 1010 may provide an indication of the orientation to foveated-image sensor 1038. In some aspects, the indication may be, or may include, an indication of the orientation of the eye, such as an angle indicating a direction of the orientation. In some aspects, the indication of the orientation may be, or may include, the ROI.

At block 1106, the computing device (or one or more components thereof) may capture, at the image sensor, a foveated image based on the indication of the orientation, the foveated image comprising a first portion and a second portion, wherein the first portion is based on the indication of the orientation and has a first resolution, and wherein the second portion has a second resolution that is lower than the first resolution. For example, foveated-image sensor 538, foveated-image sensor 638, foveated-image sensor 738, foveated-image sensor 838, foveated-image sensor 938, and/or foveated-image sensor 1038 may capture a foveated image based on the indication provided at block 1104. The foveated image may include an ROI having a higher resolution and a peripheral region having a lower resolution. In some aspects, the ROI may be based on the indication of the orientation of the eye. In some aspects, the indication of the orientation of the eye may be, or may include, an indication of the ROI, for example, pixel coordinates corresponding to the ROI. In some aspects, the indication of the orientation of the eye may be, or may include, an indication of the orientation of the eye and the image sensor may determine the ROI based on the indication of the orientation of the eye.

FIG. 12 is a flow diagram illustrating an example process 1200 for generating foveated image data, in accordance with aspects of the present disclosure. One or more operations of process 1200 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the process 1200. The one or more operations of process 1200 may be implemented as software components that are executed and run on one or more processors.

At block 1202, a computing device (or one or more components thereof) may determine, at a processor communicatively connected directly to an image sensor, an orientation of at least one eye of a user. For example, eye-tracking sensor 504 of FIG. 5, eye-tracking sensor 604 of FIG. 6, eye-tracking sensor 804 of FIG. 8, or eye-tracking sensor 1004 of FIG. 10 may be, or may include, the processor of block 1202. Additionally or alternatively, ISP 510 of FIG. 5, ISP 710 of FIG. 7, ISP 910 of FIG. 9, or ISP 1010 of FIG. 10 may be, or may include, the processor of block 1202. Eye-tracking sensor 504 and/or ISP 510 may be directly connected to foveated-image sensor 538 of FIG. 5. Eye-tracking sensor 604 may be directly connected to foveated-image sensor 638 of FIG. 6. ISP 710 may be directly connected to foveated-image sensor 738 of FIG. 7. Eye-tracking sensor 804 may be directly connected to foveated-image sensor 838 of FIG. 8. ISP 910 of FIG. 9 may be directly connected to foveated-image sensor 938. Eye-tracking sensor 1004 and/or ISP 1010 may be directly connected to foveated-image sensor 1038 of FIG. 10. The processor of any of eye-tracking sensor 504, ISP 510, eye-tracking sensor 604, ISP 710, eye-tracking sensor 804, ISP 910, eye-tracking sensor 1004, or ISP 1010 may determine an orientation of an eye of a user. In some aspects, the processor of any of eye-tracking sensor 504, ISP 510, eye-tracking sensor 604, ISP 710, eye-tracking sensor 804, ISP 910, eye-tracking sensor 1004, or ISP 1010 may determine an ROI based on the orientation of the eye of the user.

At block 1204, the computing device (or one or more components thereof) may provide an indication of the orientation of the at least one eye of the user to the image sensor. For example, eye-tracking sensor 504 and/or ISP 510 may provide an indication of the orientation to foveated-image sensor 538. As another example, eye-tracking sensor 604 may provide an indication of the orientation to foveated-image sensor 638. As another example, ISP 710 may provide an indication of the orientation to foveated-image sensor 738. As another example, eye-tracking sensor 804 may provide an indication of the orientation to foveated-image sensor 838. As another example, ISP 910 may provide an indication of the orientation to foveated-image sensor 938. As another example, eye-tracking sensor 1004 and/or ISP 1010 may provide an indication of the orientation to foveated-image sensor 1038. In some aspects, the indication may be, or may include, an indication of the orientation of the eye, such as an angle indicating a direction of the orientation. In some aspects, the indication of the orientation may be, or may include, the ROI.

At block 1206, the computing device (or one or more components thereof) may determine, at the image sensor, a region of interest based on the indication of the orientation of the at least one eye of the user. For example, foveated-image sensor 538, foveated-image sensor 638, foveated-image sensor 738, foveated-image sensor 838, foveated-image sensor 938, and/or foveated-image sensor 1038 may determine a region of interest based on the indication of the orientation provided at block 1204.

At block 1208, the computing device (or one or more components thereof) may capture, at the image sensor, a foveated image based on the region of interest, wherein the foveated image comprises a first portion and a second portion, wherein the first portion corresponds to the region of interest, wherein the first portion has a first resolution, and wherein the second portion has a second resolution that is lower than the first resolution. For example, foveated-image sensor 538, foveated-image sensor 638, foveated-image sensor 738, foveated-image sensor 838, foveated-image sensor 938, and/or foveated-image sensor 1038 may capture a foveated image based on the region of interest determined at block 1206. The foveated image may include an ROI having a higher resolution and a peripheral region having a lower resolution. The ROI may be based on the indication of the orientation of the eye determined at block 1206.

Figure 13:
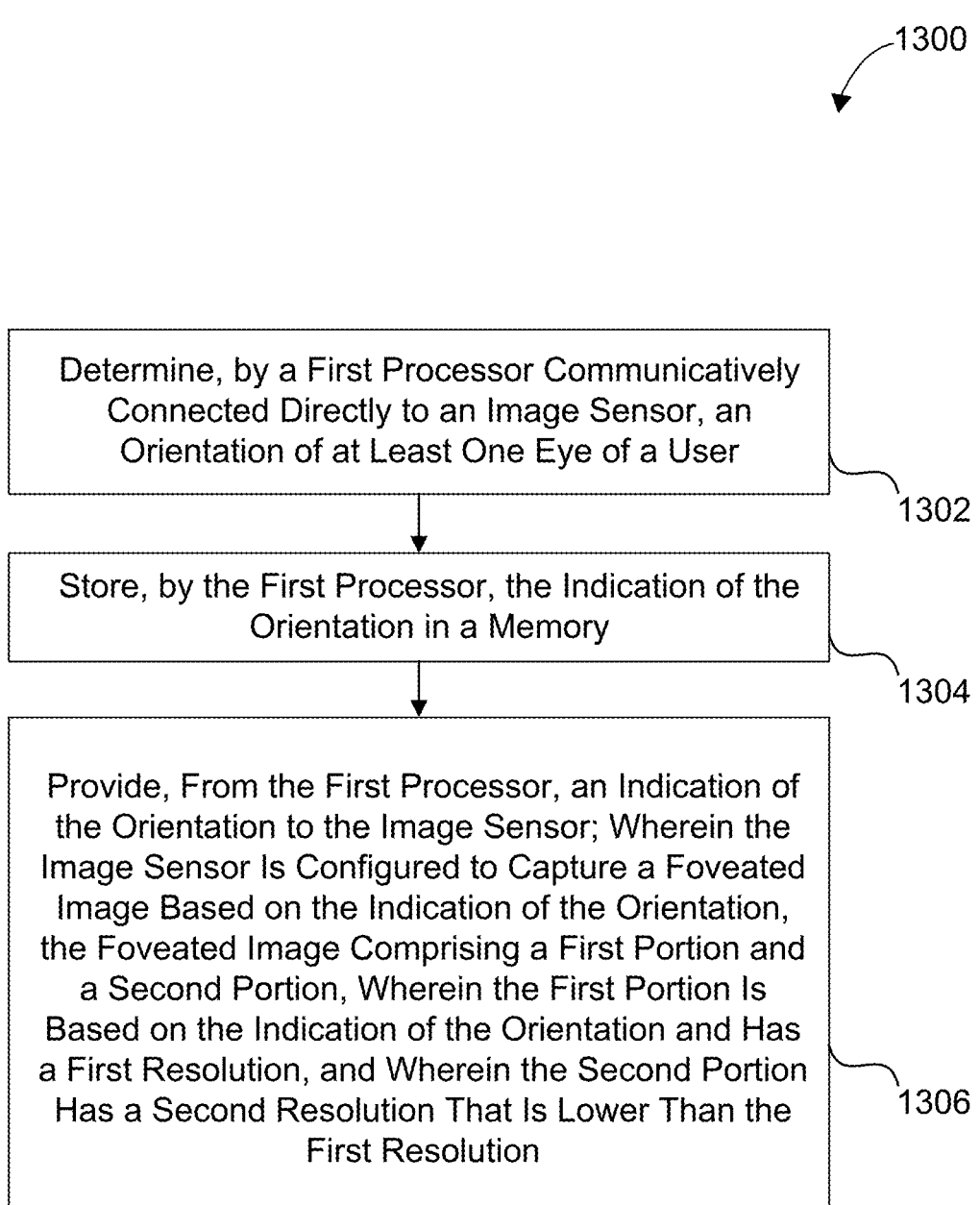
FIG. 13 is a flow diagram illustrating an example process for generating foveated image data, in accordance with aspects of the present disclosure.

FIG. 13 is a flow diagram illustrating an example process 1300 for generating foveated image data, in accordance with aspects of the present disclosure. One or more operations of process 1300 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the process 1300. The one or more operations of process 1300 may be implemented as software components that are executed and run on one or more processors.

At block 1302, a computing device (or one or more components thereof) may include a first processor configured to determine, by a first processor communicatively connected directly to an image sensor, an orientation of at least one eye of a user. For example, eye-tracking sensor 504 of FIG. 5, eye-tracking sensor 604 of FIG. 6, eye-tracking sensor 804 of FIG. 8, or eye-tracking sensor 1004 of FIG. 10 may be, or may include, the processor of block 1302. Additionally or alternatively, ISP 510 of FIG. 5, ISP 710 of FIG. 7, ISP 910 of FIG. 9, or ISP 1010 of FIG. 10 may be, or may include, the processor of block 1302. Eye-tracking sensor 504 and/or ISP 510 may be directly connected to foveated-image sensor 538 of FIG. 5. Eye-tracking sensor 604 may be directly connected to foveated-image sensor 638 of FIG. 6. ISP 710 may be directly connected to foveated-image sensor 738 of FIG. 7. Eye-tracking sensor 804 may be directly connected to foveated-image sensor 838 of FIG. 8. ISP 910 of FIG. 9 may be directly connected to foveated-image sensor 938. Eye-tracking sensor 1004 and/or ISP 1010 may be directly connected to foveated-image sensor 1038 of FIG. 10. The processor of any of eye-tracking sensor 504, ISP 510, eye-tracking sensor 604, ISP 710, eye-tracking sensor 804, ISP 910, eye-tracking sensor 1004, or ISP 1010 may determine an orientation of an eye of a user. In some aspects, the processor of any of eye-tracking sensor 504, ISP 510, eye-tracking sensor 604, ISP 710, eye-tracking sensor 804, ISP 910, eye-tracking sensor 1004, or ISP 1010 may determine an ROI based on the orientation of the eye of the user.

At block 1304, the computing device (or one or more components thereof) may store, by the first processor, the indication of the orientation in a memory. For example, ISP 510, ISP 710, ISP 910, or ISP 1010 may store the indication of the orientation in memory 514.

At block 1306, the computing device (or one or more components thereof) may provide, from the first processor, an indication of the orientation to the image sensor. For example, eye-tracking sensor 504 and/or ISP 510 may provide an indication of the orientation to foveated-image sensor 538. As another example, eye-tracking sensor 604 may provide an indication of the orientation to foveated-image sensor 638. As another example, ISP 710 may provide an indication of the orientation to foveated-image sensor 738. As another example, eye-tracking sensor 804 may provide an indication of the orientation to foveated-image sensor 838. As another example, ISP 910 may provide an indication of the orientation to foveated-image sensor 938. As another example, eye-tracking sensor 1004 and/or ISP 1010 may provide an indication of the orientation to foveated-image sensor 1038. In some aspects, the indication may be, or may include, an indication of the orientation of the eye, such as an angle indicating a direction of the orientation. In some aspects, the indication of the orientation may be, or may include, the ROI. In some aspects, the indication of the orientation of the eye may be, or may include, an indication of the ROI, for example, pixel coordinates corresponding to the ROI. In some aspects, the indication of the orientation of the eye may be, or may include, an indication of the orientation of the eye and the image sensor may determine the ROI based on the indication of the orientation of the eye.

The image sensor may be configured to capture a foveated image based on the indication of the orientation, the foveated image comprising a first portion and a second portion, wherein the first portion is based on the indication of the orientation and has a first resolution, and wherein the second portion has a second resolution that is lower than the first resolution. For example, foveated-image sensor 538, foveated-image sensor 638, foveated-image sensor 738, foveated-image sensor 838, foveated-image sensor 938, and/or foveated-image sensor 1038 may capture a foveated image based on the indication provided at block 1304. The foveated image may include an ROI having a higher resolution and a peripheral region having a lower resolution. The ROI may be based on the indication of the orientation of the eye.

In some aspects, the computing device (or one or more components thereof) may include an interface directly communicatively connecting the first processor to the image sensor, wherein the first processor is configured to provide the indication of the orientation to the image sensor using the interface. For example, the computing device (or one or more components thereof) may include interface 554 of FIG. 5, interface 654 of FIG. 6, interface 754 of FIG. 7, interface 854 of FIG. 8, interface 954 of FIG. 9, and/or interface 1054 of FIG. 10. The first processor (e.g., of eye-tracking sensor 504 and/or ISP 510) may provide the indication of the orientation to foveated-image sensor 538 using interface 554.

In some aspects, the first processor may be configured to determine a region of interest based on the orientation of the at least one eye of the user; the indication of the orientation comprises an indication of the region of interest; and the first portion of the foveated image corresponds to the region of interest. For example, eye-tracking sensor 504 and/or ISP 510 may determine an ROI based on the orientation of the eye. Eye-tracking sensor 504 and/or ISP 510 may provide the ROI to foveated-image sensor 538 and foveated-image sensor 538 may generate image data based on the ROI.

In some aspects, the indication of the region of interest may be, or may include, pixel coordinates defining the first portion of the foveated image. For example, the ROI determined by eye-tracking sensor 504 and/or ISP 510 may be, or may include, pixel coordinates defining the first portion of the foveated image.

In some aspects, the image sensor may be configured to determine a region of interest based on the indication of the orientation; and the first portion of the foveated image May correspond to the region of interest. For example, in some aspects, eye-tracking sensor 504 and/or ISP 510 may provide an indication of the orientation of eye to foveated-image sensor 538 and foveated-image sensor 538 may determine an ROI based on the orientation of the eye. Foveated-image sensor 538 may generate image data based on the ROI.

In some aspects, the indication of the region of interest may be, or may include, pixel coordinates defining the first portion of the foveated image. For example, the ROI determined by eye-tracking sensor 504 and/or ISP 510 may be, or may include, pixel coordinates defining the first portion of the foveated image.

In some aspects, the computing device (or one or more components thereof) may include a second processor configured to: read the indication of the orientation from the memory; and process the indication of the orientation. For example, the computing device (or one or more components thereof) may include processor 520 of FIG. 5, FIG. 6, FIG. 7, FIG. 8, FIG. 9, or FIG. 10. Processor 520 may read the indication of the orientation from memory 514 and process the indication of the orientation.

In some aspects, to process the indication of the orientation, the second processor may render image data based on the indication of the orientation; adjust image data based on the indication of the orientation; or display image data based on the indication of the orientation. For example, processor 520 may render foveated image data for display based on the indication of the orientation, adjust image data (e.g., to foveate the image data) based on the indication of the orientation, or display (e.g., in a foveated manner) image data based on the indication of the orientation.

In some aspects, the first processor may be configured to: cause a camera to capture an image of at least one eye of the user; and store the image of at least one eye of the user in the memory. The computing device (or one or more components thereof) may further include a second processor configured to: read the image of the at least one eye of the user from the memory; and process the image of the at least one eye of the user. For example, the first processor may be, or may be included in, eye-tracking sensor 504 and the first processor may cause eye-tracking sensor 504 to capture an image of an eye of the user. Additionally or alternatively, the first processor may be, or may be included in ISP 510 and the first processor may cause eye-tracking sensor 504 to capture an image of the eye of the user. The first processor may store the image in memory 514. The computing device (or one or more components thereof) may include processor 520 that may process the image of the eye.

In some aspects, to process the image of the eye, the second processor may render image data based on the image of the eye; adjust image data based on the image of the eye; or display image data based on the image of the eye. For example, processor 520 may render foveated image data for display based on the image of the eye, adjust image data (e.g., to foveate the image data) based on the image of the eye, or display (e.g., in a foveated manner) image data based on the image of the eye.

In some aspects, the first processor may be, or may include, an eye-facing image sensor configured to: capture images of the at least one eye; determine the orientation of the at least one eye of the user; provide the indication of the orientation to the image sensor; and store the indication of the orientation in the memory. For example, the first processor may be, or may include, eye-tracking sensor 504 of FIG. 5, eye-tracking sensor 604 of FIG. 6, eye-tracking sensor 804 of FIG. 8, or eye-tracking sensor 1004 of FIG. 10. Eye-tracking sensor 504 may capture an image of an eye, determine an orientation of the eye (which may be, or may include, an ROI and/or an indication of the orientation of the eye), provide an indication of the orientation to foveated-image sensor 538, and store an indication of the orientation in memory 514.

In some aspects, the first processor may be, or may include, an eye-facing image sensor configured to capture images of the at least one eye; and an image signal processor configured to: process the images of the at least one eye to determine the orientation of the at least one eye of the user; provide the indication of the orientation to the image sensor; and store the indication of the orientation in the memory. For example, the first processor may be, or may include, eye-tracking sensor 504 and ISP 510. Eye-tracking sensor 504 may capture an image of the eye and provide the captured image to ISP 510. ISP 510 may process the image to determine the orientation (which may be, or may include, an ROI and/or an indication of the orientation of the eye), provide the indication of the orientation to foveated-image sensor 538 and store the indication of the orientation in memory 514.

In some aspects, the first processor may be configured to predict a gaze and determine the orientation of at least one eye based on the predicted gaze. For example, in some embodiments, eye-tracking sensor 504 and/or ISP 510 may predict a gaze (e.g., predict a future gaze of the eye based on an image of the eye).

In some examples, as noted previously, the methods described herein (e.g., process 1100 of FIG. 11, process 1200 of FIG. 12, process 1300 of FIG. 13, and/or other methods described herein) can be performed, in whole or in part, by a computing device or apparatus. In one example, one or more of the methods can be performed by system 500 of FIG. 5, system 600 of FIG. 6, system 700 of FIG. 7, system 800 of FIG. 8, system 900 of FIG. 9, system 1000 of FIG. 10, or by another system or device. In another example, one or more of the methods (e.g., process 1100, process 1200, process 1300, and/or other methods described herein) can be performed, in whole or in part, by the computing-device architecture 1400 shown in FIG. 14. For instance, a computing device with the computing-device architecture 1400 shown in FIG. 14 can include, or be included in, the components of the system 500, system 600, system 700, system 800, system 900, and/or system 1000 and can implement the operations of process 1200, and/or other process described herein. In some cases, the computing device or apparatus can include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device can include a display, a network interface configured to communicate and/or receive the data, any combination thereof, and/or other component(s). The network interface can be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Process 1100, process 1200, process 1300, and/or other process described herein are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 1100, process 1200, process 1300, and/or other process described herein can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a computer-readable or machine-readable storage medium, for example, in the form of a computer program comprising a plurality of instructions executable by one or more processors. The computer-readable or machine-readable storage medium can be non-transitory.

Figure 14:
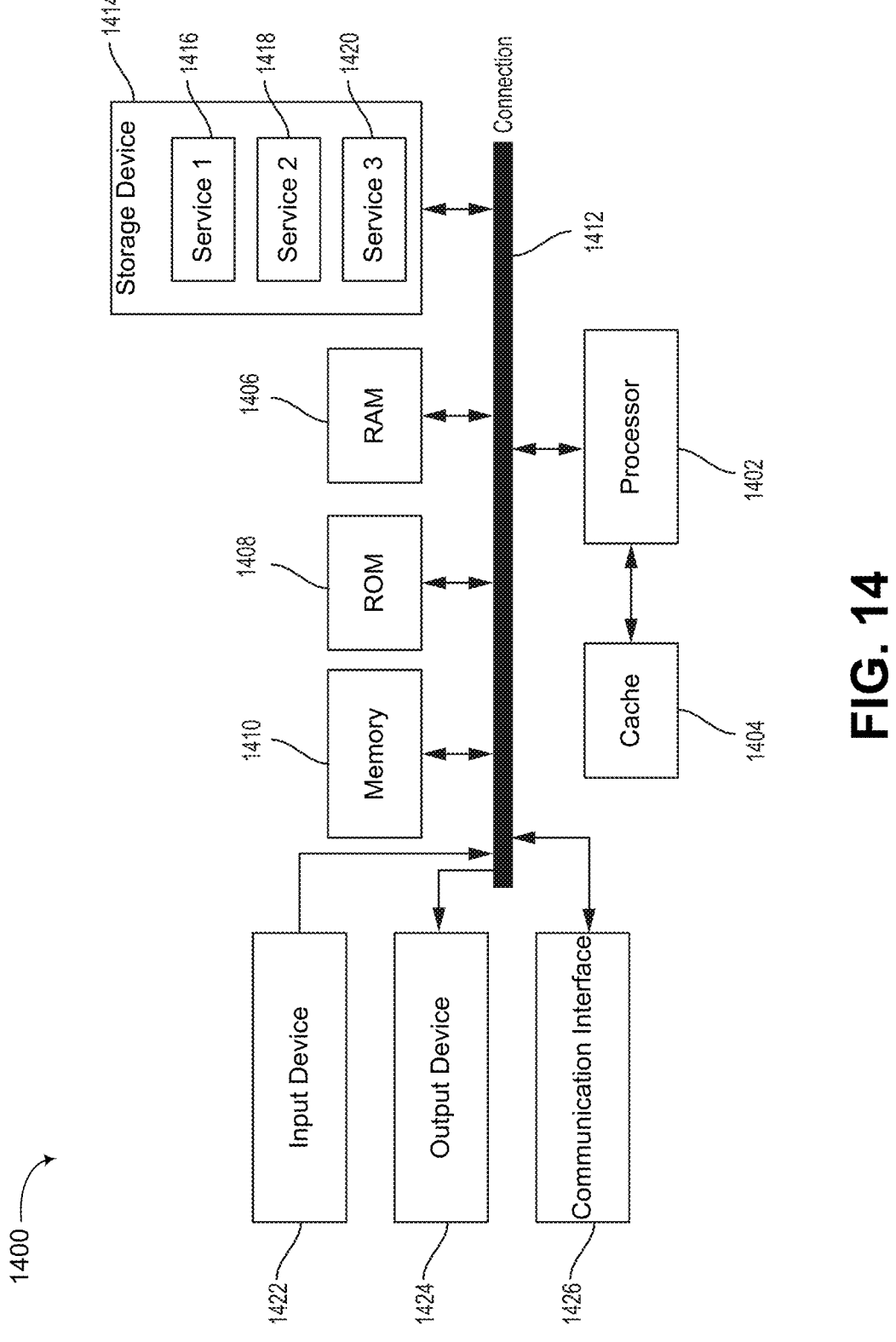
FIG. 14 is a block diagram illustrating an example computing-device architecture of an example computing device which can implement the various techniques described herein.

FIG. 14 illustrates an example computing-device architecture 1400 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing-device architecture 1400 may include, implement, or be included in any or all of system 500 of FIG. 5, system 600 of FIG. 6, system 700 of FIG. 7, system 800 of FIG. 8, system 900 of FIG. 9, system 1000 of FIG. 10, and/or other devices, modules, or systems described herein. Additionally or alternatively, computing-device architecture 1400 may be configured to perform process 1100, process 1200, process 1300, and/or other process described herein.

The components of computing-device architecture 1400 are shown in electrical communication with each other using connection 1412, such as a bus. The example computing-device architecture 1400 includes a processing unit (CPU or processor) 1402 and computing device connection 1412 that couples various computing device components including computing device memory 1410, such as read only memory (ROM) 1408 and random-access memory (RAM) 1406, to processor 1402.

Computing-device architecture 1400 can include a cache of high-speed memory connected directly with, in close proximity to, or integrated as part of processor 1402. Computing-device architecture 1400 can copy data from memory 1410 and/or the storage device 1414 to cache 1404 for quick access by processor 1402. In this way, the cache can provide a performance boost that avoids processor 1402 delays while waiting for data. These and other modules can control or be configured to control processor 1402 to perform various actions. Other computing device memory 1410 may be available for use as well. Memory 1410 can include multiple different types of memory with different performance characteristics. Processor 1402 can include any general-purpose processor and a hardware or software service, such as service 1 1416, service 2 1418, and service 3 1420 stored in storage device 1414, configured to control processor 1402 as well as a special-purpose processor where software instructions are incorporated into the processor design. Processor 1402 may be a self-contained system, containing multiple cores or processors, a bus, memory controller, cache, etc. A multi-core processor may be symmetric or asymmetric.

To enable user interaction with the computing-device architecture 1400, input device 1422 can represent any number of input mechanisms, such as a microphone for speech, a touch-sensitive screen for gesture or graphical input, keyboard, mouse, motion input, speech and so forth. Output device 1424 can also be one or more of a number of output mechanisms known to those of skill in the art, such as a display, projector, television, speaker device, etc. In some instances, multimodal computing devices can enable a user to provide multiple types of input to communicate with computing-device architecture 1400. Communication interface 1426 can generally govern and manage the user input and computing device output. There is no restriction on operating on any particular hardware arrangement and therefore the basic features here may easily be substituted for improved hardware or firmware arrangements as they are developed.

Storage device 1414 is a non-volatile memory and can be a hard disk or other types of computer readable media which can store data that are accessible by a computer, such as magnetic cassettes, flash memory cards, solid state memory devices, digital versatile disks, cartridges, random-access memories (RAMs) 1406, read only memory (ROM) 1408, and hybrids thereof. Storage device 1414 can include services 1416, 1418, and 1420 for controlling processor 1402. Other hardware or software modules are contemplated. Storage device 1414 can be connected to the computing device connection 1412. In one aspect, a hardware module that performs a particular function can include the software component stored in a computer-readable medium in connection with the necessary hardware components, such as processor 1402, connection 1412, output device 1424, and so forth, to carry out the function.

The term "substantially," in reference to a given parameter, property, or condition, may refer to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, magnetic or optical disks, USB devices provided with non-volatile memory, networked storage devices, any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general-purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods described above. The computer-readable data storage medium may form part of a computer program product, which may include packaging materials. The computer-readable medium may include memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general-purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, such as, a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for generating foveated image data, the apparatus comprising: a memory; and a first processor communicatively connected directly to an image sensor and communicatively connected to the memory, the first processor configured to: determine an orientation of at least one eye of a user; store an indication of the orientation in the memory; provide the indication of the orientation to the image sensor; wherein the image sensor is configured to capture a foveated image based on the indication of the orientation, the foveated image comprising a first portion and a second portion, wherein the first portion is based on the indication of the orientation and has a first resolution, and wherein the second portion has a second resolution that is lower than the first resolution.

Aspect 2. The apparatus of aspect 1, further comprising a second processor configured to: read the indication of the orientation from the memory; and process the indication of the orientation.

Aspect 3. The apparatus of aspect 2, wherein, to process the indication of the orientation, the second processor is configured to at least one of: render image data based on the indication of the orientation; adjust image data based on the indication of the orientation; or display image data based on the indication of the orientation.

Aspect 4. The apparatus of any one of aspects 1 to 3, wherein the first processor is configured to: cause a camera to capture an image of at least one eye of the user; and store the image of at least one eye of the user in the memory; and further comprising a second processor configured to: read the image of the at least one eye of the user from the memory; and process the image of the at least one eye of the user.

Aspect 5. The apparatus of aspect 4, wherein, to process the image of the at least one eye of the user, the second processor is configured to at least one of: render image data based on the image of the at least one eye of the user; adjust image data based on the image of the at least one eye of the user; or display image data based on the image of the at least one eye of the user.

Aspect 6. The apparatus of any one of aspects 1 to 5, wherein the first processor comprises an eye-facing image sensor configured to: capture images of the at least one eye; determine the orientation of the at least one eye of the user; provide the indication of the orientation to the image sensor; and store the indication of the orientation in the memory.

Aspect 7. The apparatus of any one of aspects 1 to 6, wherein the first processor comprises: an eye-facing image sensor configured to capture images of the at least one eye; and an image signal processor configured to: process the images of the at least one eye to determine the orientation of the at least one eye of the user; provide the indication of the orientation to the image sensor; and store the indication of the orientation in the memory.

Aspect 8. The apparatus of any one of aspects 1 to 7, further comprising an interface directly communicatively connecting the first processor to the image sensor, wherein the first processor is configured to provide the indication of the orientation to the image sensor using the interface.

Aspect 9. The apparatus of any one of aspects 1 to 8, wherein the first processor is configured to predict a gaze and determine the orientation of at least one eye based on the predicted gaze.

Aspect 10. The apparatus of any one of aspects 1 to 9, wherein: the first processor is configured to determine a region of interest based on the orientation of the at least one eye of the user; the indication of the orientation comprises an indication of the region of interest; and the first portion of the foveated image corresponds to the region of interest.

Aspect 11. The apparatus of aspect 10, wherein the indication of the region of interest comprises pixel coordinates defining the first portion of the foveated image.

Aspect 12. The apparatus of any one of aspects 1 to 11, wherein: the image sensor is configured to determine a region of interest based on the indication of the orientation; and the first portion of the foveated image corresponds to the region of interest.

Aspect 13. The apparatus of aspect 12, wherein the indication of the region of interest comprises pixel coordinates defining the first portion of the foveated image.

Aspect 14. A method for generating foveated image data, the method comprising: determining, by a first processor communicatively connected directly to an image sensor, an orientation of at least one eye of a user; storing, by the first processor, an indication of the orientation in a memory; and providing, from the first processor, the indication of the orientation to the image sensor; wherein the image sensor is configured to capture a foveated image based on the indication of the orientation, the foveated image comprising a first portion and a second portion, wherein the first portion is based on the indication of the orientation and has a first resolution, and wherein the second portion has a second resolution that is lower than the first resolution.

Aspect 15. The method of aspect 14, further comprising: reading, by a second processor, the indication of the orientation from the memory; and processing, by the second processor, the indication of the orientation.

Aspect 16. The method of aspect 15, wherein processing the indication of the orientation comprises: rendering image data based on the indication of the orientation; adjusting image data based on the indication of the orientation; or displaying image data based on the indication of the orientation.

Aspect 17. The method of any one of aspects 14 to 16, further comprising: causing, by the first processor, a camera to capture an image of at least one eye of the user; storing, by the first processor, the image of at least one eye of the user in the memory; reading, by a second processor, the image of the at least one eye of the user from the memory; and processing, by the second processor, the image of the at least one eye of the user.

Aspect 18. The method of aspect 17, wherein processing the image of the at least one eye of the user comprises: rendering image data based on the image of the at least one eye of the user; adjusting image data based on the image of the at least one eye of the user; or displaying image data based on the image of the at least one eye of the user.

Aspect 19. The method of any one of aspects 14 to 18, wherein the first processor comprises an eye-facing image sensor configured to: capture images of the at least one eye; determine the orientation of the at least one eye of the user; provide the indication of the orientation to the image sensor; and store the indication of the orientation in the memory.

Aspect 20. The method of any one of aspects 14 to 19, wherein the first processor comprises: an eye-facing image sensor configured to capture images of the at least one eye; and an image signal processor configured to: process the images of the at least one eye to determine the orientation of the at least one eye of the user; provide the indication of the orientation to the image sensor; and store the indication of the orientation in the memory.

Aspect 21. The method of any one of aspects 14 to 20, wherein the first processor provides the indication of the orientation to the image sensor using an interface directly communicatively connecting the first processor to the image sensor.

Aspect 22. The method of any one of aspects 14 to 21, further comprising: predicting, by the first processor, a gaze; and determining, by the first processor, the orientation of at least one eye based on the predicted gaze.

Aspect 23. The method of any one of aspects 14 to 22, further comprising: determining, by the first processor, a region of interest based on the orientation of the at least one eye of the user; wherein the indication of the orientation comprises an indication of the region of interest; and wherein the first portion of the foveated image corresponds to the region of interest.

Aspect 24. The method of aspect 23, wherein the indication of the region of interest comprises pixel coordinates defining the first portion of the foveated image.

Aspect 25. The method of any one of aspects 14 to 24, further comprising determining, by the image sensor, a region of interest based on the indication of the orientation; wherein the first portion of the foveated image corresponds to the region of interest.

Aspect 26. The method of aspect 25, wherein the indication of the region of interest comprises pixel coordinates defining the first portion of the foveated image.

Aspect 27. A non-transitory computer-readable storage medium having stored thereon instructions that, when executed by at least one processor, cause the at least one processor to perform operations according to any of aspects 14 to 26.

Aspect 28. An apparatus for providing virtual content for display, the apparatus comprising one or more means for perform operations according to any of aspects 14 to 26.

What is claimed is:

1. An apparatus for generating foveated image data, the apparatus comprising:
   a first processor communicatively connected to an eye-facing image sensor, a scene-facing image sensor and a memory, wherein the memory is accessible to a second processor, wherein the first processor is configured to:
   generate eye-orientation data based on an image of at least one eye of a user captured by the eye-facing image sensor, wherein the eye-orientation data comprises a position of the at least one eye relative to a coordinate system;
   store the eye-orientation data in the memory for processing by the second processor; and
   provide the eye-orientation data directly to the scene-facing image sensor, wherein the scene-facing image sensor is configured to capture a foveated image based on a region of interest (ROI) associated with the eye-orientation data, the foveated image comprising a first portion and a second portion, wherein the first portion is based on the ROI and has a first resolution, and wherein the second portion has a second resolution that is lower than the first resolution.

2. The apparatus of claim 1, further comprising the second processor, wherein the second processor is configured to:
   read the eye-orientation data from the memory; and
   process the eye-orientation data.

3. The apparatus of claim 2, wherein, to process the the eye-orientation data, the second processor is configured to at least one of:
   render image data based on the eye-orientation data;
   adjust image data based on the eye-orientation data; or
   display image data based on the eye-orientation data.

4. The apparatus of claim 1, wherein the first processor is configured to store the image of the at least one eye of the user in the memory; wherein the apparatus further comprises the second processor, wherein the second processor is configured to:
   read the image of the at least one eye of the user from the memory; and
   process the image of the at least one eye of the user.

5. The apparatus of claim 4, wherein, to process the image of the at least one eye of the user, the second processor is configured to at least one of:
   render image data based on the image of the at least one eye of the user;
   adjust image data based on the image of the at least one eye of the user; or
   display image data based on the image of the at least one eye of the user.

6. The apparatus of claim 1, wherein the eye-facing image sensor is configured to:

capture images of the at least one eye;

determine an orientation of the at least one eye of the user;

provide the eye-orientation data to the scene-facing image sensor; and store the eye-orientation data in the memory.

7. The apparatus of claim 1, wherein the first processor comprises: an image signal processor configured to:

process the image of the at least one eye to determine an orientation of the at least one eye of the user;

provide the eye-orientation data to the scene-facing image sensor; and store the eye-orientation data in the memory.

8. The apparatus of claim 1, further comprising an interface directly communicatively connecting the first processor to the scene-facing image sensor, wherein the first processor is configured to provide the eye-orientation data to the scene-facing image sensor using the interface.

9. The apparatus of claim 1, wherein the first processor is configured to predict a gaze and determine an orientation of at least one eye based on the predicted gaze.

10. The apparatus of claim 1, wherein:

the scene-facing image sensor is configured to determine the ROI based on the eye-orientation data; and the first portion of the foveated image corresponds to the region of interest ROI.

11. The apparatus of claim 10, wherein ROI comprises pixel coordinates defining the first portion of the foveated image.

12. The apparatus of claim 1, wherein the coordinate system is associated with the apparatus.

13. A method for generating foveated image data, the method comprising:

capturing an image of at least one eye of a user at an eye-facing image sensor;

generating, by a first processor communicatively connected directly to a scene-facing image sensor, eye-orientation data based on the image of at least one eye of a user;

storing, by the first processor, the eye-orientation data in a memory for processing by a second processor, wherein the memory is accessible to the second processor, wherein the eye-orientation data comprises a position of the at least one eye relative to a coordinate system; and providing, from the first processor, the eye-orientation data directly to the scene-facing image sensor, wherein the scene-facing image sensor is configured to capture a foveated image based on the orientation a region of interest (ROI) associated with the eye-orientation data, the foveated image comprising a first portion and a second portion, wherein the first portion is based on the ROI and has a first resolution, and wherein the second portion has a second resolution that is lower than the first resolution.

14. The method of claim 13, further comprising:

reading, by the second processor the eye-orientation data from the memory; and processing, by the second processor, the eye-orientation data.

15. The method of claim 14, wherein processing the eye-orientation data comprises:

rendering image data based on the eye-orientation data;

adjusting image data based on the eye-orientation data; or displaying image data based on the eye-orientation data.

16. The method of claim 13, further comprising:

storing, by the first processor, the image of the at least one eye of the user in the memory;

reading, by the second processor, the image of the at least one eye of the user from the memory; and processing, by the second processor, the image of the at least one eye of the user.

17. The method of claim 16, wherein processing the image of the at least one eye of the user comprises:

rendering image data based on the image of the at least one eye of the user;

adjusting image data based on the image of the at least one eye of the user; or displaying image data based on the image of the at least one eye of the user.

18. The method of claim 13, wherein the first processor comprises the eye-facing image sensor, and wherein the eye-facing image sensor is configured to:

capture the image of the at least one eye;

determine an orientation of the at least one eye of the user;

provide the eye-orientation data to the scene-facing image sensor; and store the eye-orientation data in the memory.

19. The method of claim 13, wherein the first processor comprises:

the eye-facing image sensor, wherein the eye-facing image sensor is configured to capture images of the at least one eye; and an image signal processor configured to:

process the images of the at least one eye to determine an orientation of the at least one eye of the user;

provide the eye-orientation data to the scene-facing image sensor; and store the eye-orientation data in the memory.

20. The method of claim 13, wherein the coordinate system is associated with the eye-facing image sensor.

* * * * *